United States Patent

Sauermann et al.

(10) Patent No.: US 7,231,387 B2
(45) Date of Patent: Jun. 12, 2007

(54) PROCESS FOR PERFORMING LOGICAL COMBINATIONS

(75) Inventors: Volker Sauermann, Heidelberg (DE);
Axel Von Bergen, Wiesloch (DE);
Arne Schwarz, Walldorf (DE)

(73) Assignee: SAP Aktiengesellschaft, Walldorf (DE)

( * ) Notice: Subject to any disclaimer, the term of this patent is extended or adjusted under 35 U.S.C. 154(b) by 443 days.

(21) Appl. No.: 10/677,736

(22) Filed: Oct. 3, 2003

(65) Prior Publication Data

US 2005/0021506 A1    Jan. 27, 2005

(30) Foreign Application Priority Data

Jul. 8, 2003 (EP) .................................. 03015365

(51) Int. Cl.
*G06F 17/30* (2006.01)

(52) U.S. Cl. ..................... 707/4; 707/3; 707/5; 707/102

(58) Field of Classification Search .............. 707/1–10, 707/100–104.1
See application file for complete search history.

(56) References Cited

U.S. PATENT DOCUMENTS

| | | | |
|---|---|---|---|
| 4,849,905 A | | 7/1989 | Loeb et al. |
| 5,355,473 A | | 10/1994 | Au |
| 5,471,611 A | * | 11/1995 | McGregor ..................... 707/4 |
| 5,557,786 A | | 9/1996 | Johnson, Jr. |
| 5,715,413 A | * | 2/1998 | Ishai et al. ................... 715/825 |
| 5,737,732 A | | 4/1998 | Gibson et al. |
| 6,829,695 B1 | * | 12/2004 | Ross ............................... 712/1 |
| 2002/0032676 A1 | | 3/2002 | Wheat et al. |

FOREIGN PATENT DOCUMENTS

| | | |
|---|---|---|
| EP | 0 657 830 A1 | 6/1995 |
| WO | WO 02/061612 A | 8/2002 |
| WO | WO 02/061613 A | 8/2002 |

OTHER PUBLICATIONS

Haerder, Theo ahd Erhard Rahm; "Datenbanksysteme," 1999, Springer, Heidelberg, pp. 207-210,☐☐227-233. figs. 7.15.8.1 and 8.2.B. English translation provided. 10 pgs.*

(Continued)

*Primary Examiner*—Mohammad Ali
*Assistant Examiner*—Sangwoo Ahn
(74) *Attorney, Agent, or Firm*—Fish & Richardson P.C.

(57) ABSTRACT

Techniques are described for performing logical operations, where the techniques generally involve the use of dynamic flags used as markers to build a result set in response to a search query. The dynamic flags within a result set may be guide elements linked to one another, and to their respective data records and attributes, via pointers. In this case, the groups of guide elements forming result sets may each also be linked to one another via pointers, and may each be associated with a counter for counting a number of guide elements within a corresponding result set. The dynamic flags also may be individual bits within a bitmap, where the bitmap is linked to a particular result set identifier via a pointer, and the individual bitmaps are linked to their corresponding data record(s) via a relative addressing scheme. In this case, a counter also may be used to determine a number of hits within a result set (bitmap), before, during, and after a particular logical operation.

16 Claims, 30 Drawing Sheets

OTHER PUBLICATIONS

Date, C.J., "Introduction to Database Systems, vol. 1," 1990, Addison Wesley, Reading, MA, USA, paragraph '03.6!, figs. 3.17 and 3.18.

Haerder, Theo and Erhard Rahm, "Datenbanksysteme," 1999, Springer, Heidelberg, pp. 207-210, 227-233, figs. 7.15, 8.1 and 8.2.B, English translation provided, 10 pgs.

* cited by examiner

| InfoCell ||
|---|---|
| LeftInfoType 702 ● | RightInfoType 704 ● |
| LeftInfoCourse 712 ● | RightInfoCourse 714 ● |
| LeftSelfRing 722 ● | RightSelfRing 724 ● |
| Data 732 ||

FIG. 7

PROCESS FOR PERFORMING LOGICAL COMBINATIONS

CROSS-REFERENCE TO RELATED APPLICATIONS

This application claims priority under 35 U.S.C. 119 based on European application No. 03015365.4, filed on Jul. 8, 2003, and titled "METHOD AND COMPUTER SYSTEM FOR QUERY PROCESSING."

TECHNICAL FIELD

This description relates to database searching techniques.

BACKGROUND

Computer systems provide various systems for storing and accessing data. In particular, it is often important that such systems provide an ability to search through large numbers of individual data records so as to locate a particular record or group of records having a pre-defined characteristic. Moreover, it is often desirable that such searches may be performed, and results obtained, as quickly as possible.

For example, in a customer database having millions of records, where each record corresponds to an individual customer, it may be important to locate customer(s) that are in a certain age group, or that live in a particular area. Similarly, it may be important to locate a record of a particular customer, when only limited information about that customer is available.

Further, it is often the case that such searches involve compound queries, such as Boolean queries. For example, when searching the customer database mentioned above, it may be necessary to perform a search for customers having the last name Smith AND living in the city Heidelburg.

In such cases, even if a system is designed to perform relatively fast searches for queries having single conditions, it may be the case that the system is inefficient or incapable of performing a database search based on a logical combination of multiple conditions. Moreover, even if the system is capable of performing such logical combinations, it may be the case that the system fails to perform sufficiently quickly to satisfy a level of demand of users of the database system.

SUMMARY

According to one general aspect, a first result set is built, and a logical operation is performed based on the first result set. Building the first result set includes identifying a first data record, the first data record including a first attribute from among a first attribute set, the first attribute set stored in a first tree structure, and assigning a first marker to the first data record, wherein the first marker is included in the first result set.

Implementations may include one or more of the following features. For example, a second result set may be built, wherein building the second result set includes identifying a second data record, the second data record including a second attribute from among the first attribute set.

In this case, the first data record and the second data record may be stored in a second tree structure. In performing the logical operation, a logical AND combination may be performed between the first result set, based on the first marker, and the second result set, based on the second attribute.

A second marker may be assigned to the second attribute. In this case, performing the logical operation may include performing a logical AND combination between the first result set, based on the first marker, and the second result set, based on the second marker. Performing the logical operation also may include performing a logical OR combination between the first result set, based on the first marker, and the second result set, based on the second marker.

In performing the logical combination, a logical NOT combination may be performed on the first result set, based on the first marker, by de-selecting data records associated with the first result set and selecting remaining data records that include attributes from the first attribute set other than the first attribute. The first marker may be an instantiation of an object class in an object-oriented programming language, and linked to the first data record via a pointer.

Identifying the first data record may be in response to a first query. In this case, building the first result set may include associating a second marker with a second data record including the first attribute, in response to the first query, and grouping the first marker and the second marker into the first result set.

Further, grouping the first marker and the second marker may include assigning a first pointer between the first marker and the second marker. In this case, a second result set may be built and linked to the first result set using pointers, wherein building the second result set includes selecting a third data record, the third data record including a third attribute from among a second attribute set, and associating a third marker with the third attribute.

In this case, in performing the logical operation, the logical operation may be performed between the first result set and the second result set to obtain a final result set, the first and third marker may be determined to be included in the final result set, the second marker may be determined to be not included in the final result set, the second marker may be deleted from the final result set, and the first pointer may be re-directed from the first marker to the third marker. In this case, a counter may be associated with the third result set, and operable to indicate a number of markers within the third result set.

In assigning the first marker to the first data record, a value of a first bit may be changed within a first bitmap. In this case, bits within the bitmap may correspond in number to a total amount of data records available for searching. Further, a second result set may be built, wherein building the second result set includes selecting a second data record, the second data record including a second attribute from among a second attribute set. A first result set identifier may be linked with the first bitmap via a first pointer, and a second result set identifier may be linked with a second bitmap via a second pointer, wherein the first result set identifier and the second result set identifier are linked together in a second tree structure.

Also, a second marker may be assigned to the second attribute by changing a value of a second bit within a second bitmap. In this case, performing the logical operation may include performing a bitwise combination between the first bitmap and the second bitmap, to thereby obtain a third bitmap. Then, a counter may be associated with the third bitmap, the counter being operable to count a number of changed-value bits within the third bitmap.

The logical operation may be performed using a bitwise logical operation using the first bitmap. The first bit may be associated with the first data record by calculating a bitmap memory address of the first bit relative to a data record memory address of the first data record.

According to another general aspect, a system for searching data includes an interface operable to input data records, attributes associated with the data records, and queries, and further operable to output the data records, the attributes, and query responses. The system includes a data storage device operable to store the attributes in a first tree structure, and further operable to store the data records in a second structure, the second structure relating a first data record to a first attribute. The system also includes a search subsystem operable to build a first result set in response to a first query, the first result set including a first marker associated with the first data record, and further operable to perform a logical operation based on the first result set.

Implementations may have one or more of the following features. For example, the second structure may be a second tree structure.

The search subsystem may be further operable to build a second result set in response to a second query, the second result set including a second marker associated with a second data record. In this case, the search subsystem may be further operable to perform the logical operation based on the first marker and the second marker, to thereby build a third result set which includes at least one of the first marker and the second marker.

Further, a counter may be associated with the third result set and operable to count a total number of markers within the third result set. In this case, the marker may be an instantiation of an object class in an object-oriented programming language, and markers within and between the first result set, the second result set, and the third result set may be linked together using pointers.

The first marker and the second marker may be changed-value bits within a first bitmap and a second bitmap, respectively. In this case, the search subsystem may perform the logical operation by performing a bitwise combination of the first bitmap and the second bitmap, to thereby obtain a third bitmap as the third result set.

Further, the search subsystem may associate the first bit within the first bitmap with the first data record by calculating a bitmap memory address of the first bit relative to a data record memory address of the first data record. Also, the search subsystem may be further operable to link a first result set identifier with the first bitmap via a first pointer, and to link a second result set identifier with the second bitmap via a second pointer, wherein the first result set identifier and the second result set identifier are linked together in a second tree structure.

According to another general aspect, an apparatus comprising a storage medium having instructions stored thereon. The instructions include a first code segment for selecting a first marker within a first result set, the first marker associated with a first data record including a first attribute that is stored in an attribute tree structure, a second code segment for performing a logical operation based on the first marker, a third code segment for individually selecting remaining markers within the first result set, where the second code segment iteratively performs further logical operations based on the remaining markers, and a fourth code segment for building a final result set based on the logical operations.

Implementations may include one or more of the following features. For example, the second code segment may include a fifth code segment for deleting markers which are not included in the final result set, and a sixth code segment for decreasing a counter associated with the first result set accordingly.

The first code segment may include a fifth code segment for selecting a second marker within a second result set, the second marker associated with a second data record including a second attribute that is stored in the attribute tree structure. In this case, the second code segment may include a sixth code segment for performing the logical operations based on the first marker and the second marker, so that the final result set includes at least one of the first marker and the second marker.

Further, the first marker may be an instantiation of an object class in an object-oriented programming language. In this case, a seventh code segment may be included for linking markers within and between the first result set and the second result set together using pointers.

The first marker and the second marker may be changed-value bits within a first bitmap and a second bitmap, respectively. In this case, the second code segment may be for performing the logical operation by performing a bitwise combination of the first bitmap and the second bitmap, to thereby obtain a third bitmap as the third result set.

Further, the fourth code segment may be for associating the first bit within the first bitmap with the first data record by calculating a bitmap memory address of the first bit relative to a data record memory address of the first data record. Also, a fifth code segment may be included for linking a first result set identifier with the first bitmap via a first pointer, and also for linking a second result set identifier with the second bitmap via a second pointer, wherein the first result set identifier and the second result set identifier are linked together in a second tree structure.

The details of one or more implementations are set forth in the accompanying drawings and the description below. Other features will be apparent from the description and drawings, and from the claims.

DESCRIPTION OF DRAWINGS

FIG. 7 is a diagram of an InfoCell data structure.

DETAILED DESCRIPTION

As described above, systems exist for enabling relatively fast searches for queries having single conditions. To better describe techniques for performing searches based on a logical combination of multiple conditions, it is useful to first describe an example of a fast query system.

Generally speaking, a data store is a collection of information encoded in a machine-based format, such as, for example, a database, a flat file, a spreadsheet, a file system, or any combination thereof. Applications may be provided to access a data store to search and retrieve the information (i.e., data) contained therein. Many business applications rely on data stores to store, search, and retrieve business data. As computation power increases, data store queries may bottleneck system performance. It is desirable to improve the performance of data store queries.

Information stored in a data store may be freeform, such as a text files, web pages, or articles, or it may be structured such as data records or XML files. Relational database management systems (RDBMS), such as Oracle, Sybase, DB2, SQL Server, and Informix, provide a mechanism for storing, searching, and retrieving structured data. For example, an RDBMS storing a customer list may facilitate searching and receiving customers records by fields such as name, company, or address. When fields are often used in data queries, the fields may be indexed in an RDBMS system to reduce the time needed to satisfy those queries. Indexing may reduce search times from linear time (e.g., searching each record for possible matches) to logarithmic time (e.g., using a tree-based indexing scheme) or to constant time (e.g., using a hash-based indexing scheme).

Freeform text search systems are sometimes implemented by creating structured data representing a freeform record. Then, structured data techniques may be applied to the freeform records. For example, a list of words in a web page may be used to create structured data linking the words to the web page. The structured data may be indexed and stored such that a user perform queries to identify web pages containing a particular word.

In RDBMS systems, data records are typically organized into tables. Each table includes one or more data records and each data record includes one or more fields. For example, a customer table may include a data record for each customer with each data record including fields such as the following: customer number, first name, last name, address, and telephone number. The performance of an RDBMS system may be improved by indexing fields that are often used in queries. For example, if users often search for customer numbers and last names, those fields may be indexed to reduce the time it takes to satisfy such queries. For example, a B-tree index may be used to reduce the search time from linear time to logarithmic time. In a conventional data query system, the indexes typically are created and stored apart from the data that is indexed.

Figure 1:
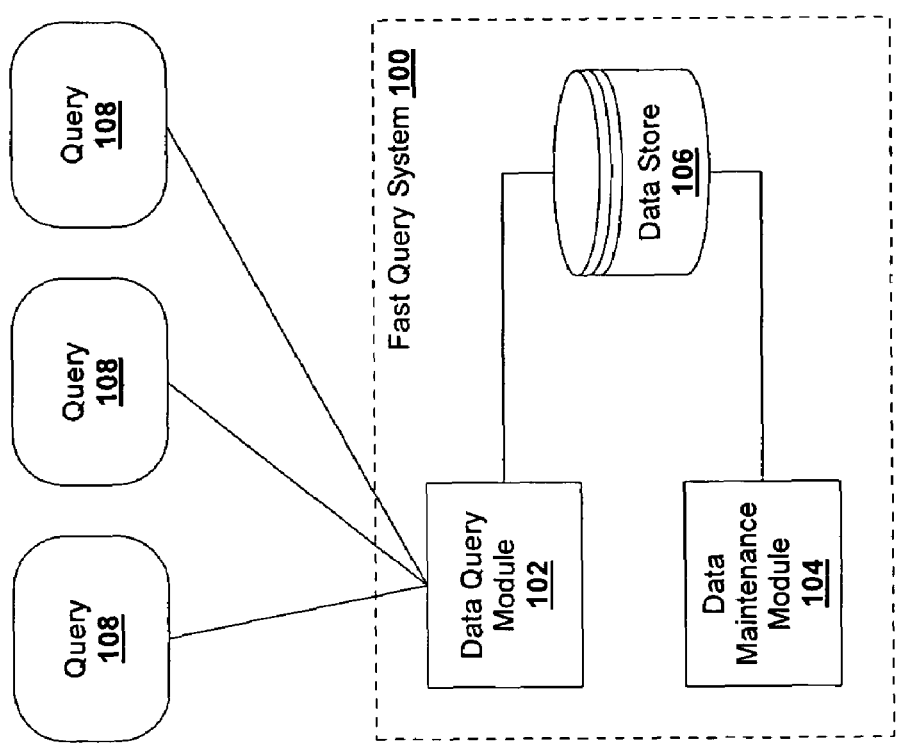
FIG. 1 is a block diagram of a data query system.

Referring to FIG. 1, a fast query system 100 includes a data query module 102, a data maintenance module 104, and a data store 106. The data query module 102 receives and processes queries 108. Data queries may be formulated in a proprietary query language, or in a standard query language such as the structured query language (SQL). The data maintenance module 104 may perform maintenance tasks such as data loads, backups, indexing, and optimization. The data maintenance module 104 may be used to load data from, for example, a flat file or RDBMS into the fast query system 100. Loaded data is stored in the data store 106 in a format to facilitate fast responses to queries as is described below with respect to FIGS. 2, 3, and 4.

In one implementation, the fast query system 100 receives a query 108 formulated in the SQL query language. The data query module 102 processes the query and returns data records from the data store 106 satisfying the query 108. For example, a business application may select all customer records corresponding to customers with a last name of "Smith" by sending the following query 108 to the fast query system 100:

SELECT*FROM Customer WHERE Name="Smith".

Figure 2:
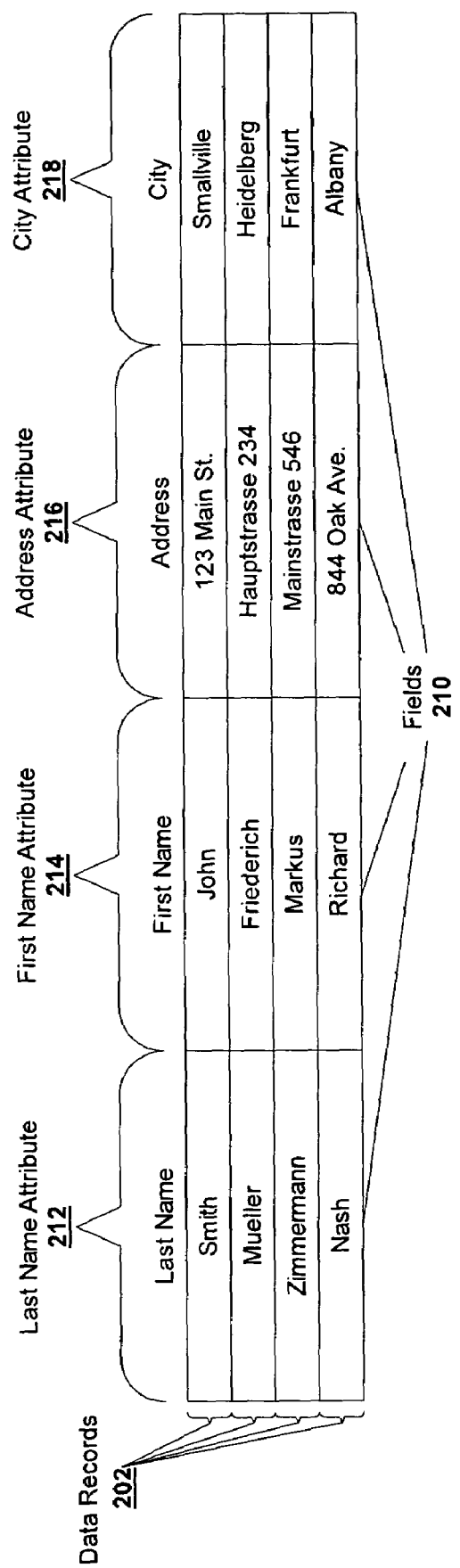
FIG. 2 is a diagram of a series of data records and their corresponding fields.

Referring to FIG. 2, the data store 106 maintains data in data structures to facilitate efficient search and retrieval. In a conventional RDBMS system, data is organized into tables with each table including data records 202 having one or more fields 210. In this example, each data record 202 includes a last name attribute 212, a first name attribute 214, an address attribute 216, and a city attribute 218. This data is maintained in the data store 106 in a tree structure. Each attribute is indexed to facilitate searching on a particular field 210 and each data record 202 is stored to facilitate retrieval of other fields 210 within a given data record 202.

Figure 3:
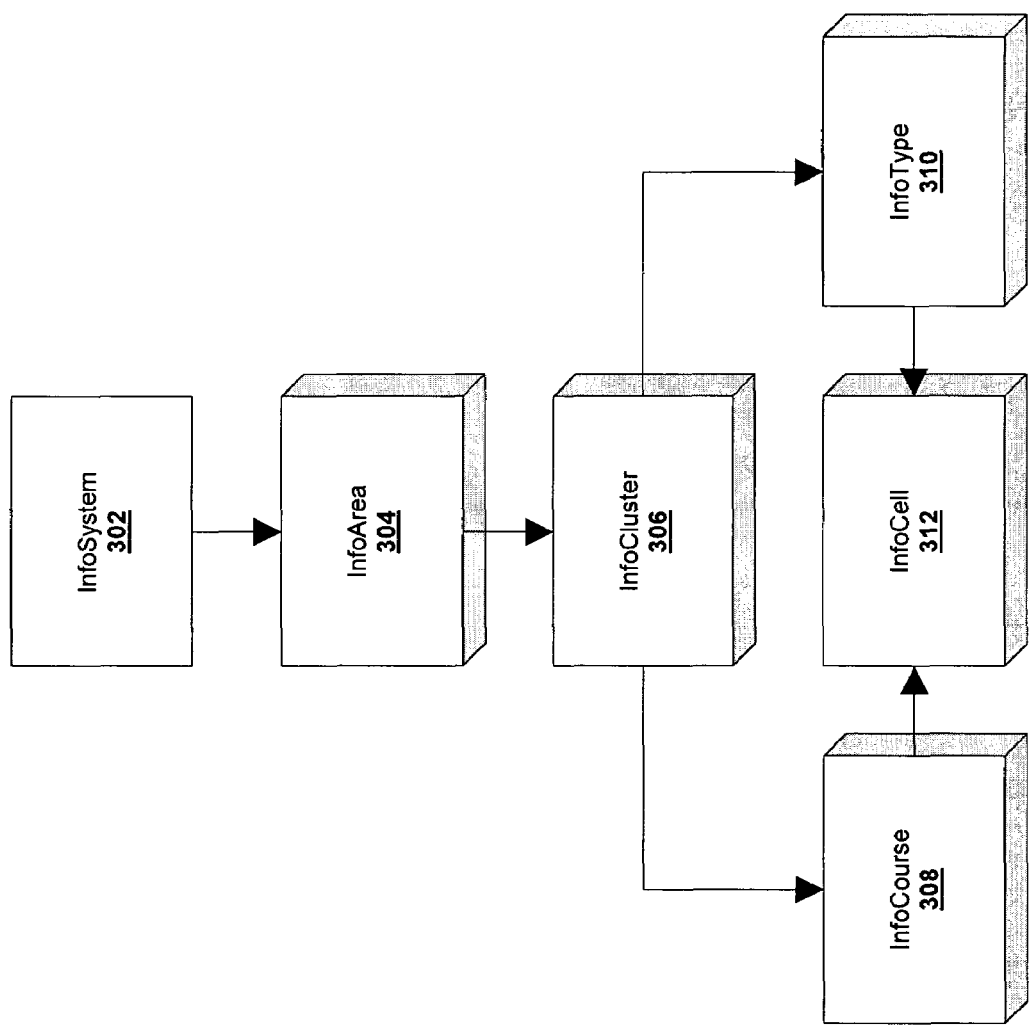
FIG. 3 is a block diagram of various data abstractions used in a fast query system to represent attributes and data records.

Referring to FIG. 3, in some implementations, the fast query system 100 is organized using the following abstractions. All data stored in a fast query system 100 is stored within an InfoSystem 302. The InfoSystem 302 roughly corresponds to an RDBMS system in a relational database model. Each InfoSystem 302 includes one or more InfoAreas 304. Each InfoArea 304 is roughly equivalent to a database in an RDBMS system. An InfoArea 304 includes one or more InfoClusters 306 which are similar to tables within an RDBMS system. An InfoCluster 306 includes one or more InfoCourses 308 and one or more InfoTypes 310 with InfoCourses 308 representing data records and Info-Types 310 representing attributes within an InfoCluster 306. An individual field 210 in a data record 202 is represented by an InfoCell 312. Each InfoCell 312 appears in at least one InfoType 310 representing the data record 202 of the field 210 and at least one InfoCourse 308 representing an attribute corresponding to the data records 202.

In implementations having a single database, the Info-System 302 and InfoArea 304 are not necessary. In such systems, the InfoCluster 306 may serve as the highest-level abstraction within a fast query system 100.

Figure 4:
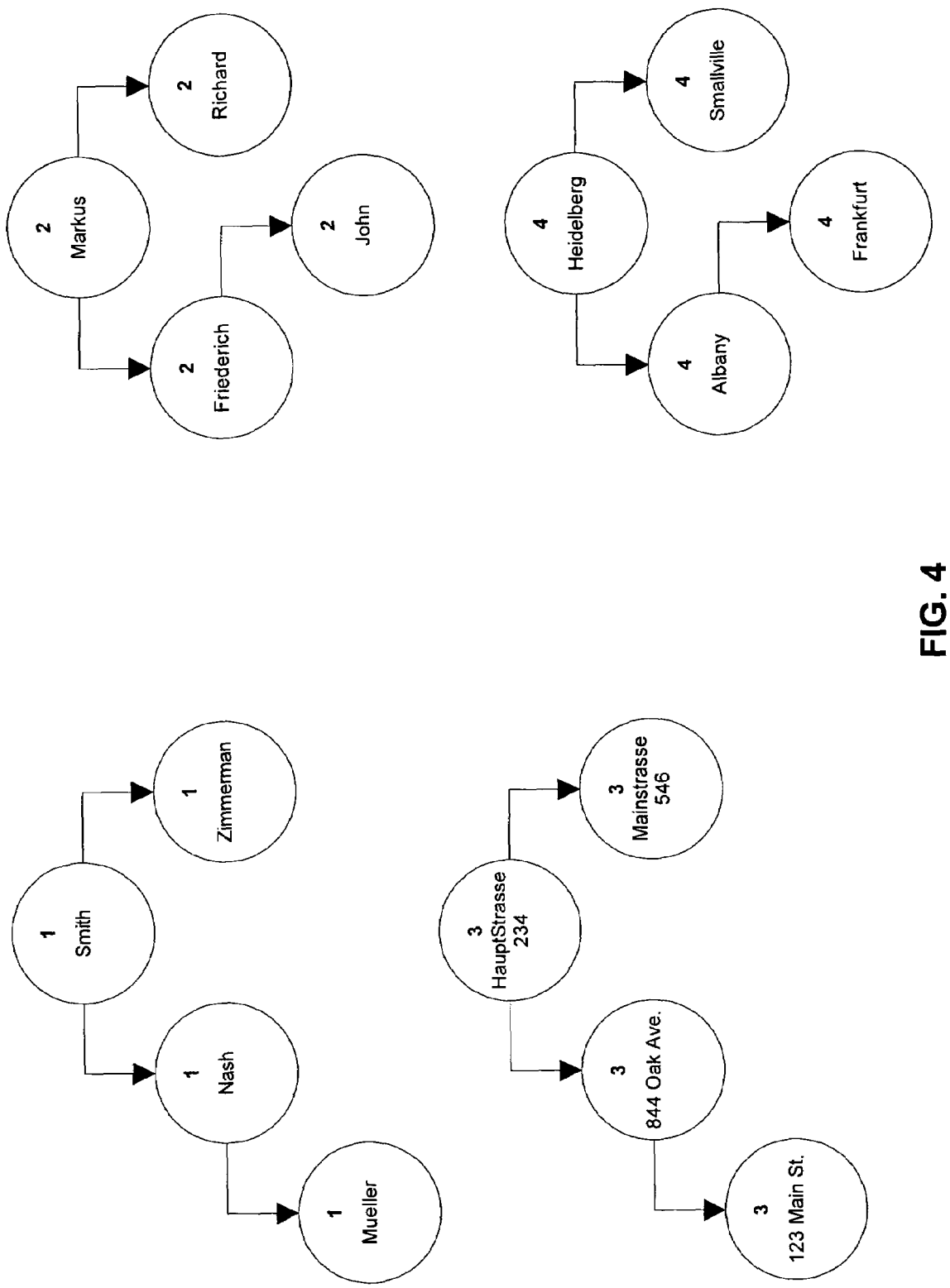
FIG. 4 is a diagram of InfoType tree structures indexing attributes within a fast query system.

Referring to FIG. 4, InfoTypes 310 and InfoCourses 308 may be implemented using any indexing structure including tree structures or hash tables. For example, conventional balanced tree structures such as red-black trees and AVL trees may be used. FIG. 4 illustrates InfoTypes 310 using balanced binary trees used in an AVL index. In this example, each node within the InfoType 310 includes a left and right pointer. A node's left pointer identifies elements less than the node and a node's right pointer identifies elements greater than the node. For example, "Nash" is less than "Smith" and "Zimmerman" is greater than "Smith." The numbers on each node in FIG. 4 represent the node's InfoType 310. The number "1" represents the last name attribute 212, "2" represents the first name attribute 214, "3" represents the address attribute 216, and "4" represents the city attribute 218. Each attribute is represented by a corresponding Info-Type 310.

Figure 5:
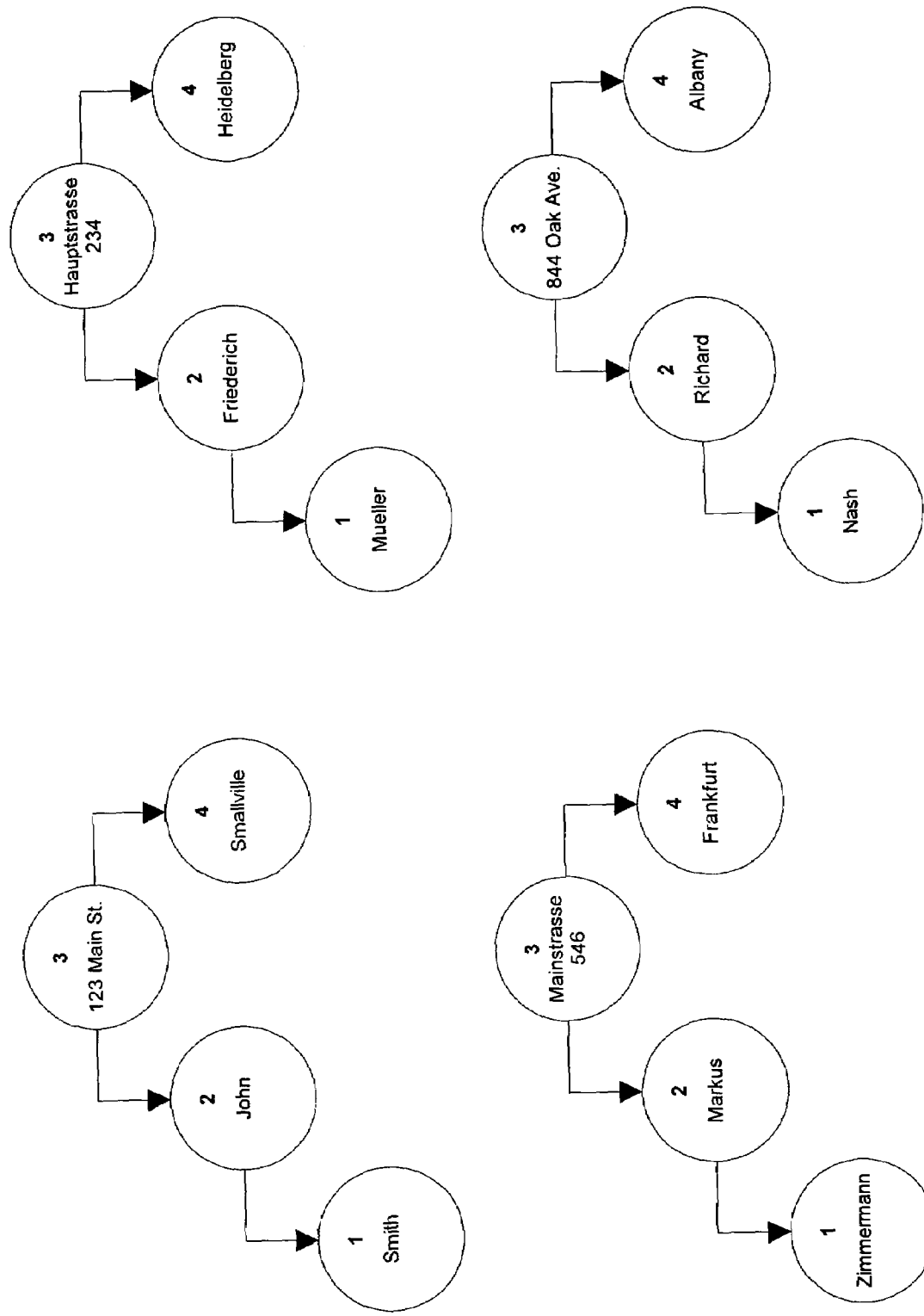
FIG. 5 is a diagram of InfoCourse tree structures indexing data records within a fast query system.

Referring to FIG. 5, InfoCourses 308 represent data records 202 in a data query system 100. The fields 210 within a data record 202 may be indexed to facilitate retrieval of a specific field 210. For example, FIG. 5 shows four AVL trees indexing fields 210 in an InfoCourse 308. Each field 210 is represented by an InfoCell 312. Alternatively, any other indexing technique may be used including, but not limited to, red-black trees, B-trees, or hash tables. In this example, an arbitrary number corresponding to an InfoType 310 is used to index the data record 202 within an InfoCourse 308. In the first tree in FIG. 5, the root node, numbered "3," stores the address attribute 216, "123 Main St." To its right is the city attribute 218, "Smallville," because its corresponding number "4" is greater than "3." To its left is the first name attribute 214, "John," with a corresponding number "2" less than "3." Finally, the last name attribute 212, "Smith," with a corresponding number "1" is to the left of the first name attribute 214.

Figure 6:
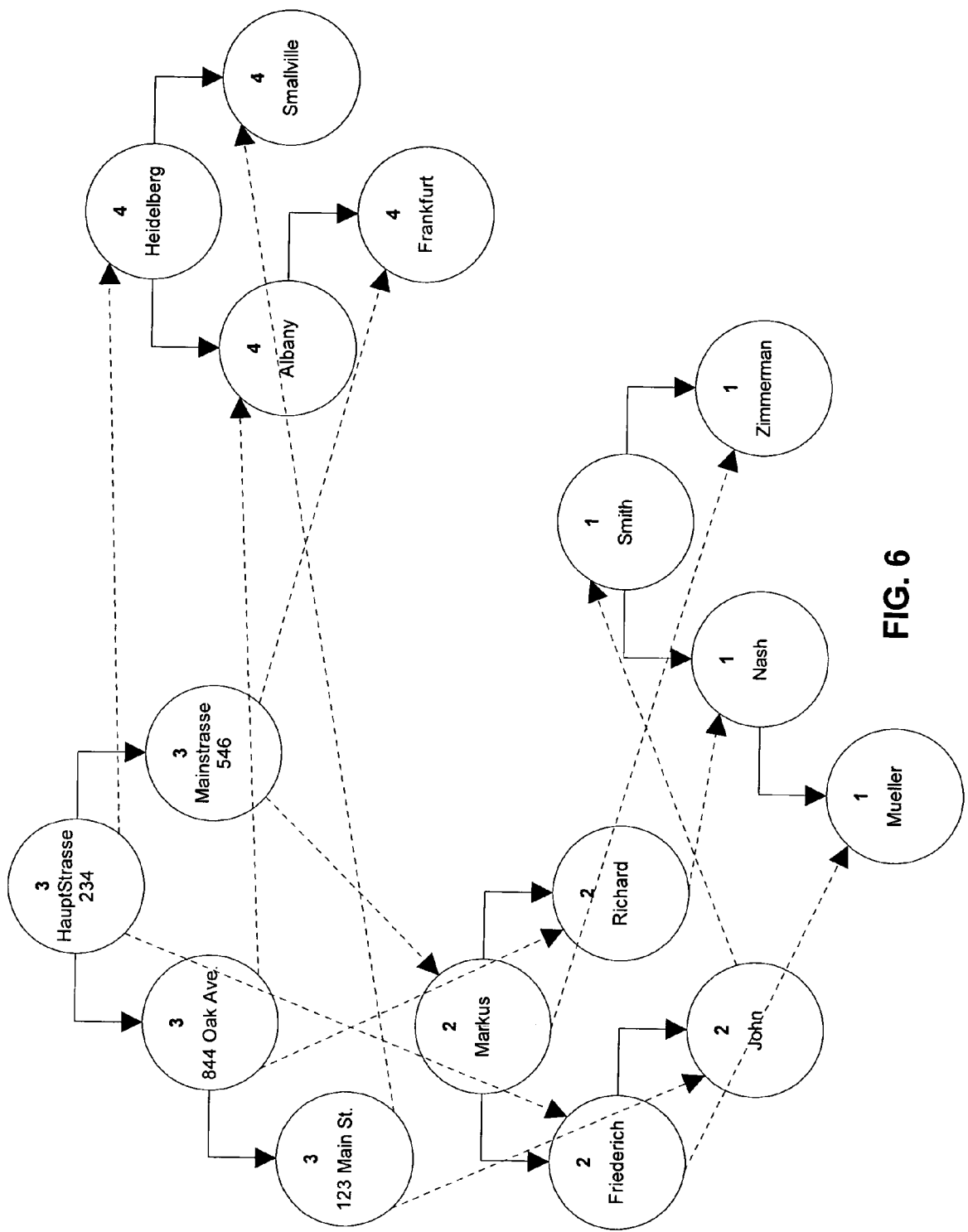
FIG. 6 is a diagram showing the relationships between InfoTypes and InfoCourses.

Referring to FIG. 6, the InfoCourse 308 and InfoType 310 data structures are integrated with one another to form an InfoCluster 306. Each node within the nfoType 310 and InfoCourse 308 data structures is represented by an InfoCell 312. This allows the system to traverse an InfoType 310 to quickly find data records 202 that satisfy a query and to traverse an InfoType 308 for a particular data record 202 to locate a desired field 210.

FIG. 7 shows an exemplary InfoCell 312 data structure that may be used by InfoCourses 308 and InfoTypes 310. The InfoCell 312 includes a left InfoType pointer 702 and a right InfoType pointer 704. These pointers are used to define an nfoType 310 tree structure. For example, in FIG. 4 the InfoCell 312 for the last name attribute 212 "Smith" includes a left InfoType pointer 702 to the "Nash" InfoCell 312 and a right InfoType pointer 704 to the "Zimmerman" InfoCell 312. Some InfoCell 312 data structures do not need a left InfoType pointer 702 or a right InfoType pointer 704. Blank InfoType pointers 702 or 704 may point to the null value or may reference an anchor node of the InfoType 310. An anchor node points to the root node of the InfoType 310 so the system may begin a tree traversal or so that the system may identify when the bottom of the tree has been reached. Additionally, the root node of the tree may be located by traversing the tree until the anchor node is reached. Similarly, a left InfoCourse pointer 712 and a right InfoCourse pointer 714 are used to define an InfoCourse 308 tree structure. Each InfoCourse 308 also may include an anchor node.

If more than one InfoCell 312 in an InfoType 310 are equivalent, then the equivalent InfoCells 312 are not less than or greater than each other and so may be represented in the same location in the InfoType 310 data structure. A left self ring pointer 722 and a right self ring pointer 724 may be used to represent each equivalent InfoCell 312 in an Info-Type 310 as a ring with InfoCell 312 in the InfoType 310 tree and the equivalents being linked to one another using the left self ring pointer 722 and right self ring pointer 724. Finally, data in an InfoCell 312 is stored in the data field 732.

This fast query application maintains an InfoCell 312 for each attribute value in each data record. To provide fast query functionality for a data store having 5.3 million records and each record having 10 attributes, this implementation of a fast query system stores 53 million InfoCell 312 data structures.

Whether a data store such as the fast query system 100 is used to access a relatively small number of records, the 53 million data records just mentioned, or even more data records, there will often be a need to perform logical combinations to execute search queries having multiple conditions. Techniques discussed below provide examples for performing such logical combinations quickly and efficiently.

More specifically, as described above, the fast query system 100 may include a cache having various data structures residing in main memory, and may be used to perform data searches. The searches described above generally relate to determinations of single conditions, such as "customers named smith," or "customer under age 35." Using the techniques described herein, it is also possible to perform searches which depend upon some logical combination(s) of such conditions.

In the discussion below, the term "logical combination," or "logical operation," generally refers to searches which require performance of a standard Boolean logic operation regarding one, two, or more conditions. The basic Boolean logic operations are known to be the logical AND, the logical OR, and the logical NOT. Other Boolean logic operations exist, such as the Exclusive AND (XAND), the NOT AND ("NAND"), the Exclusive OR ("XOR"), and the NOT OR ("NOR"). However, such operations can be considered to be variations and/or combinations of the AND, OR, and NOT operations, and so are not explicitly discussed in further detail herein.

As referred to above, there are various ways that the fast query system 100 may input queries for searching, depending on interfaces offered by (i.e., compatible with) the fast query system (for example, the SQL queries discussed above). In general, any interface or meta-format may be used to post a query to a fast query system as described herein. For example, the query may have a pre-structured format, or may be coded in Extensible Mark-up Language ("XML"), or may be passed to the fast query system as a string to be parsed within the fast query system.

Regardless of how the query is input to the fast query system 100, the below discussion assumes that the query involves some type of logical combination. For example, the query may request all customers named "Smith" AND having the characteristic "under age 35," or may request all customers "over age 35" OR "weighing over 200 lbs," or may request all customers who are NOT named "Jones." Result sets of such queries may be further logically combined, so as to perform compound logical combinations.

FIG. 6 illustrates, by virtue of the illustrated dotted lines, that fields of each record (i.e., Info Course) are bundled into a tree structure. In this data structure(s), some number of records (e.g., 5 million customers and their related information, such as their respective home street addresses and home cities) is loaded into the fast query system data store. The records each have some number of attributes, where the attributes, as already explained, are analogous to columns within a relational table. Thus, for 5 million records, 5 million Info Course trees also exist, one for each record.

If a number of the attributes is 100, then each Info Course Tree will include 100 nodes. An Info Course Tree may be associated with an Anchor Element that points to the respective Info Course Tree. Thus, when loading 5 million records (Info Course trees) into the data store of the fast query system, then 5 million Info Course Anchors also exist.

Figure 8:
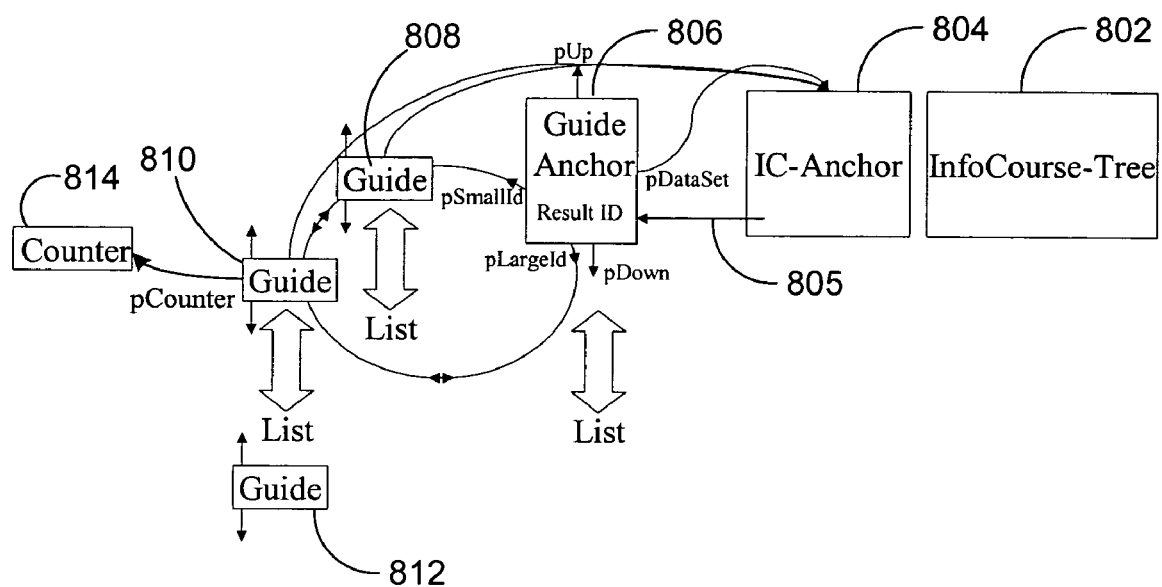
FIG. 8 is a block diagram of a technique for building result sets to be used in performing logical combinations.

FIG. 8 is a block diagram of a technique for building result sets to be used in performing logical combinations. In FIG. 8, the relationship just referred to between an Info Course Tree 802 and an Info Course Anchor 804 is illustrated; of course, it should be understood from the above discussion that Info Course Tree 802 and Info Course anchor 804 represent each of the, for example, five million records associated with the fast query system discussed herein.

Further in FIG. 8, the Info Course Anchor 804 has a corresponding guide anchor 806. The guide anchor 806 is associated with Info Course anchor 804 using a pointer 805, which points from the Info Course anchor 804 to the guide anchor 806. It should be understood that the Info Course anchor 804 and the guide anchor 806 are similar in that they are both instances of different classes, but are different with respect to their individual properties and behaviors, as described in more detail below.

The guide anchor 806 is a docking point for a guide element 808 and a guide element 810. Guide elements 808 and 810 are instances of a class that play the role of a dynamic flag, so that a selection of guide element 808 and/or 810 indicates that the record (i.e., Info Course Tree 802) represented by the guide anchor 806 has been selected as part of some query to the fast query system 100. For example, a query such as "customers named Smith" might result in the selection of Info Course Tree 802, so that guide element 808 is instantiated as part of a result set including all hits for "customers named Smith." Similarly, guide element 810 may be instantiated to mark selection of Info Course Tree 802 in response to some other query, such as "customers named John."

To compile such result sets, many guide elements may be linked together in a pointer list, using pointers pUp and pDown. In FIG. 8, the guide element 810 is part of a result set list with a guide element 812. That is, the guide element 812 is linked to the guide element 810, as well as to another guide anchor, Info Course Anchor and its associated Info Course Tree (not shown), where this Info Course Tree also may be a positive response to the query "customers named John."

Thus, a list of guide elements, such as guide elements 810 and 812, form a result set, and each result set may be identified by a unique result set identifier (ID), such as a numeric identifier. Using this technique, a particular record (i.e., Info Course Tree) can be reached from a guide element by the guide element's pointer pDataSet. It should be understood that guide anchor 806 may similarly be linked to other guide anchors (not shown), using pointers pUp and/or pDown.

Further, a counter 814 may be associated with each result set (such as the result set including guide elements 810 and 812) via a pointer pCounter, so that an accurate count of a number of results (guide elements) within each result set may be maintained. In this way, whenever a result set is created or updated (e.g., has a guide element added to or removed from the result set), the result set's associated counter may be updated accordingly.

As shown in FIG. 8, multiple result sets may exist simultaneously. With respect to a particular guide anchor, such as guide anchor 806, guide elements are linked in a circular structure, using pointers pSmallId and pLargeId. As indicated by the pointer names, guide elements within a particular circular structure are sorted by their respective result IDs, so that the circular structure can be run through in both directions to find the guide element of a particular result set. The fact that the Guides in the circular Structure are sorted by result ID determines which direction the structure should be run through to optimize a search speed for returning a particular result ID (result set).

As explained in more detail below, the structure of FIG. 8 and related techniques can be used by the fast query system 100, or other system, for a number of purposes. For example, the fast query system 100 may determine a number of counts within a result set, using counters such as counter 814. As explained below, such counters can be dynamically increased/decreased, so that a number of elements within a result set is always immediately available.

Additionally, the structure of FIG. 8 may be used to return a selection of hits matching a given query. For example, in a case where 20,000 records are returned in response to a given query, a final result set will contain 20,000 corresponding guide elements. If a user needs the $5,000^{th}$ result, or the 5,000–5,100 results, then a corresponding result set can be used to satisfy such a request. For example, the $5,000^{th}$ result may be located by running down the elements of the result set, and counting until 5,000. The next 100 records can then be read from the tree structures as described above (i.e., using anchor and Info Course Tree information, the fast query system 100 may jump into the attributes of a specific record and reads the value(s) therefrom).

Then, values can be serialized into, e.g., a network send buffer or any other kind of appropriate communication structure. For example, any type of transport format and/or rearrangement, or concatenation of data may be used for the network send buffer, e.g. the use of fixed lengths. One prerequisite for successful communication between the fast query system 100 and an application is that the receiving application knows which format will be used.

For a fast location of a specific record (e.g. Number 5,390) it may be useful to subdivide a result set into intervals. For example, a pointer may be used which points to the guide element in the middle of the result set (e.g. Element 10,000 of 20,000). Similarly, further pointers which point to the first elements of the four quartiles of the result set (e.g. elements 5,000, 10,000, 15,000, and 20,000 of 20,000 Records), or to smaller/larger subdivisions of the result set.

In this way, depending upon an offset requested by an application, it is possible to jump to the nearest interval pointer, and then sequentially run through only a part of the result set to count until the requested element has been reached. Since it is possible to run downwards and upwards through a result set, it is useful to choose the direction in which the least number of elements must be considered.

For example, if there are 20,000 elements in a result set, and record 15,390 is requested as an offset (and no interval pointers are available), then it would be reasonable to start at the bottom of the result set list, i.e., record 20,000, and run through 20,000−15,390+1=4,611 elements, rather than starting at the top of the chain and examining 15,390 elements. The same holds for the use of intervals; i.e., it can easily be determined whether a specific record may be located more efficiently running upwards or downwards through an interval.

Figure 9:
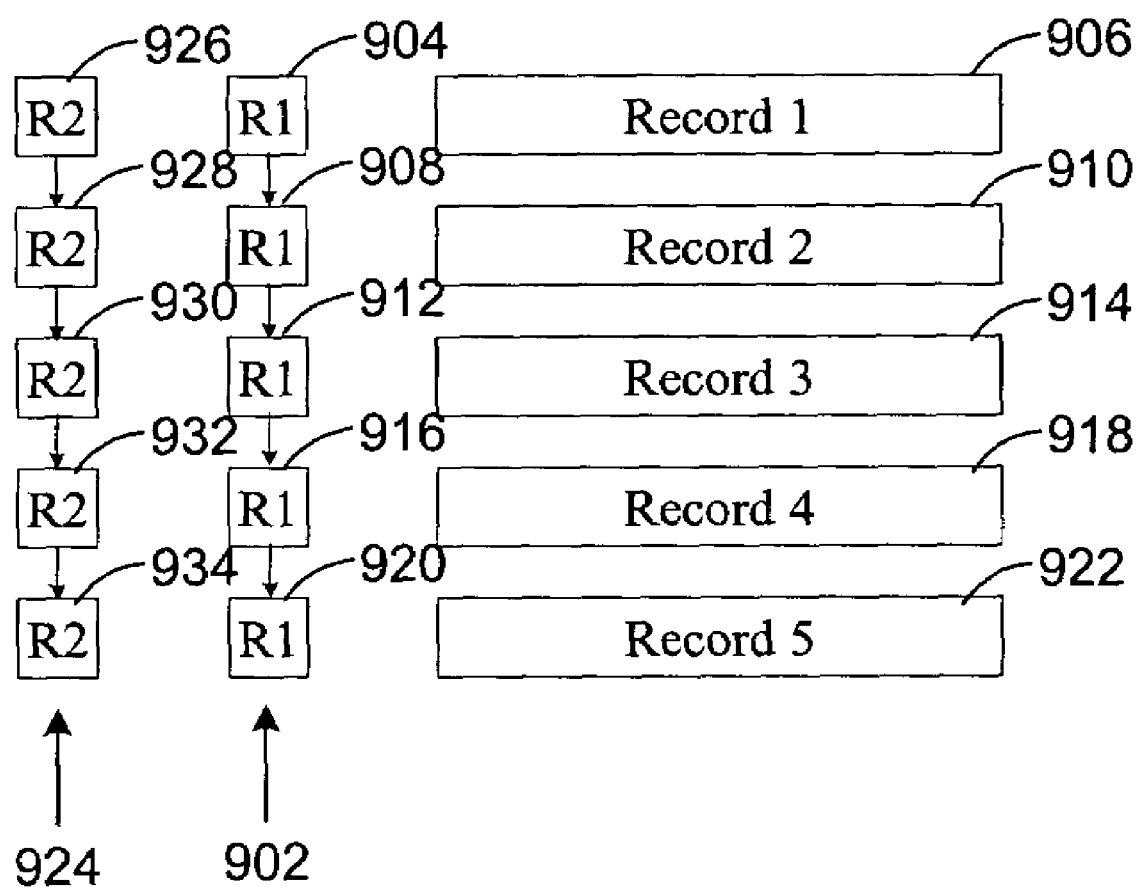
FIG. 9 is a first illustration of result sets built using the technique of FIG. 8.

FIG. 9 is a first illustration of result sets built using the technique of FIG. 8. In FIG. 9, a first result set 902 includes a first guide element 904 associated with a first record (Info Course Tree) 906, a second guide element 908 associated with a second record 910, a third guide element 912 associated with a third record 914, a fourth guide element 916 associated with a fourth record 918, and a fifth guide element 920 associated with a fifth record 922. Similarly, a second result set 924 includes a first guide element 926 associated with the first record 906, a second guide element 928 associated with the second record 910, a third guide element 930 associated with the third record 914, a fourth guide element 932 associated with the fourth record 918, and a fifth guide element 934 associated with the fifth record 922.

It should be understood that each of the guide elements within first result set 902 may be linked to one another and to their respective records in the manner shown in FIG. 8, i.e., via pointers pUP/pDown and pDataSet. Also, it should be understood that result sets 902 and 924 might stem from the result of a simple query, or might be the result(s) of a previously-performed compound query, that are now being used as part of a secondary compound query.

Figure 10:
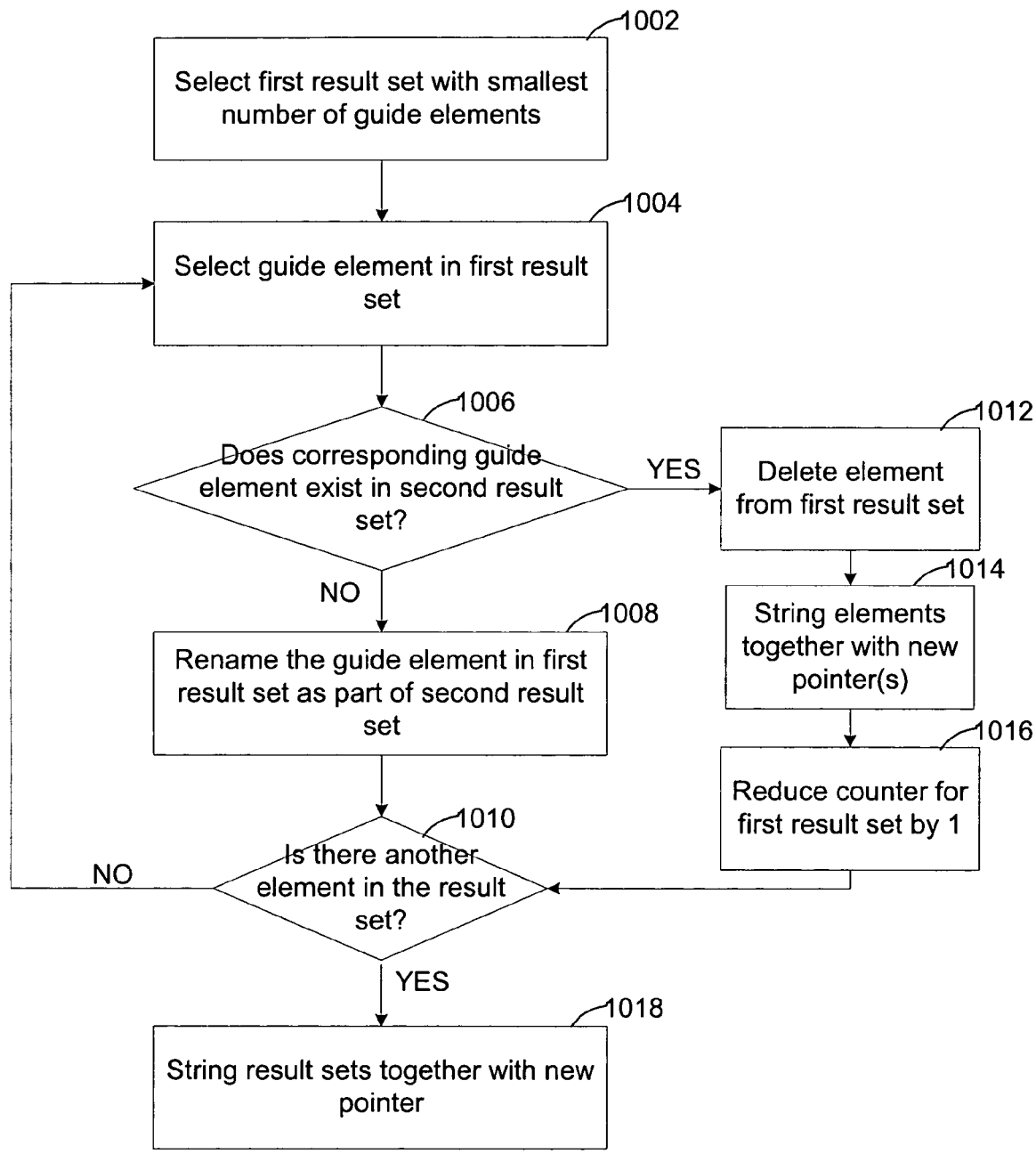
FIG. 10 is a flowchart illustrating an implementation of a logical OR operation.

FIG. 10 is a flowchart illustrating an implementation of a logical OR operation, and is referenced below with respect to FIGS. 11–15.

Figure 11:
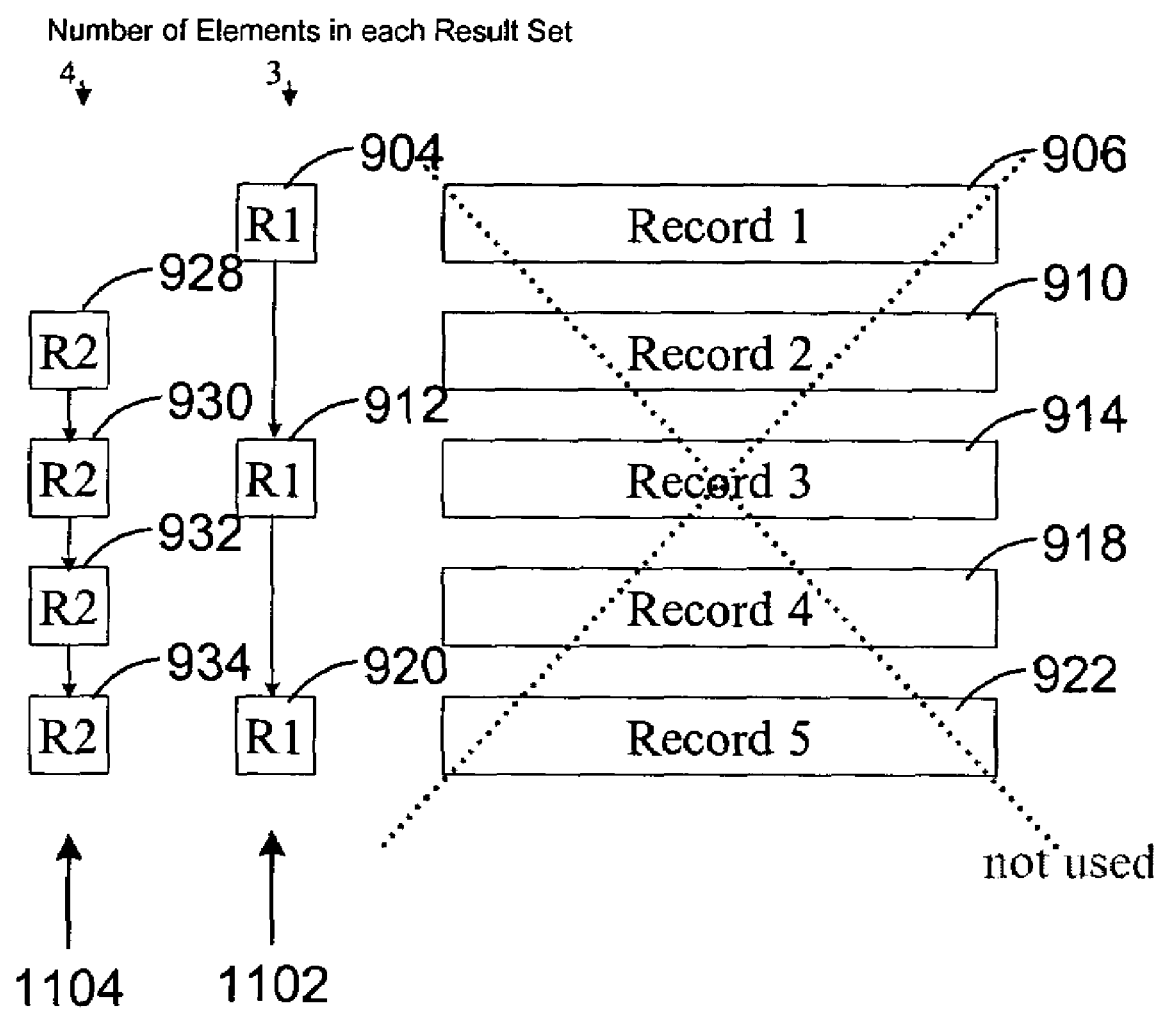
FIG. 11 is a first illustration of result sets being used in a logical OR operation.

FIG. 11 is a first illustration of result sets being used in a logical OR operation. In FIG. 11, a result set 1102 includes the guide elements 904, 912, and 920. A result set 1104 contains the guide elements 928, 930, 932, and 934. In performing a logical OR operation of the result sets 1102 and 1104, it is not necessary to use any of the records, 906, 910, 914, 918, and 922. By performing the operation on abstracted markers (i.e., the guide elements) representing the records, rather than on the records themselves, the operation can be performed quickly and efficiently.

Figure 12:
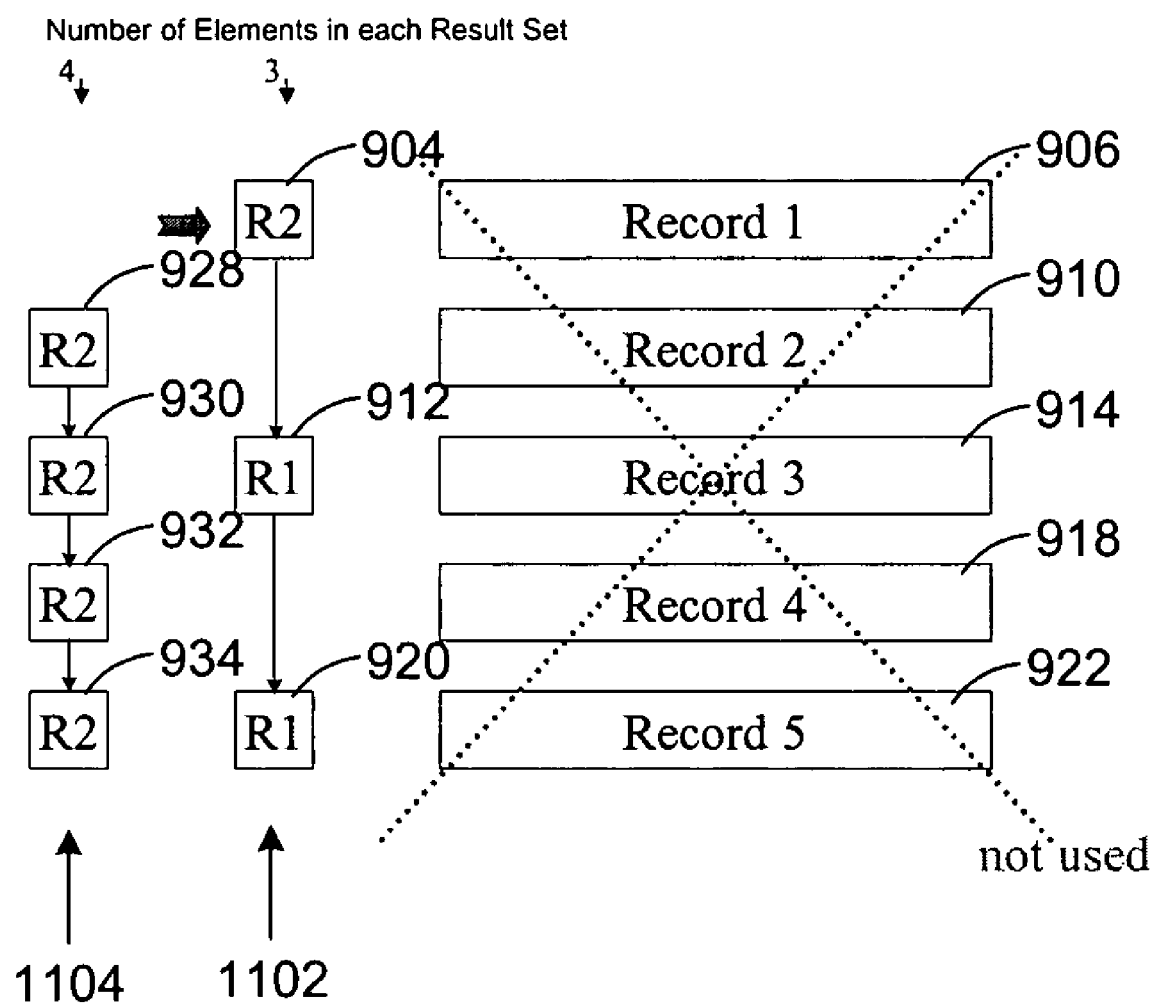
FIG. 12 is a second illustration of the result sets of FIG. 11 being used in a logical OR operation.

FIG. 12 is a second illustration of the result sets of FIG. 11 being used in a logical OR operation. In FIG. 12, the result set 1102 is selected first, because it has fewer elements than result set 1104 (1002 in FIG. 10). Within result set 1102, element 904 is selected (1004 in FIG. 10), and the fast query system 100 checks whether a corresponding element exists in result set 1104 (1006 in FIG. 10). To find out whether a corresponding element does in fact exist in the result set 1104, the fast query system 100 may move along the circular structure explained above with respect to FIG. 8, searching for a guide element with the result ID of result set 1104.

In the case of FIGS. 11 and 12, the element 904 does not have a corresponding element within the result set 1104; therefore, the element 904 is renamed and included within the result set 1104 (1008 in FIG. 10). More specifically, a result ID associated with the element 904 as part of the result set 1102 is re-set as the result ID associated with the result set 1104. In this case, counters associated with result sets 1102 and 1104 are not altered, since the number of elements within each result remains the same (although one element within the result set 1102 has been renamed, as just described).

Figure 13:
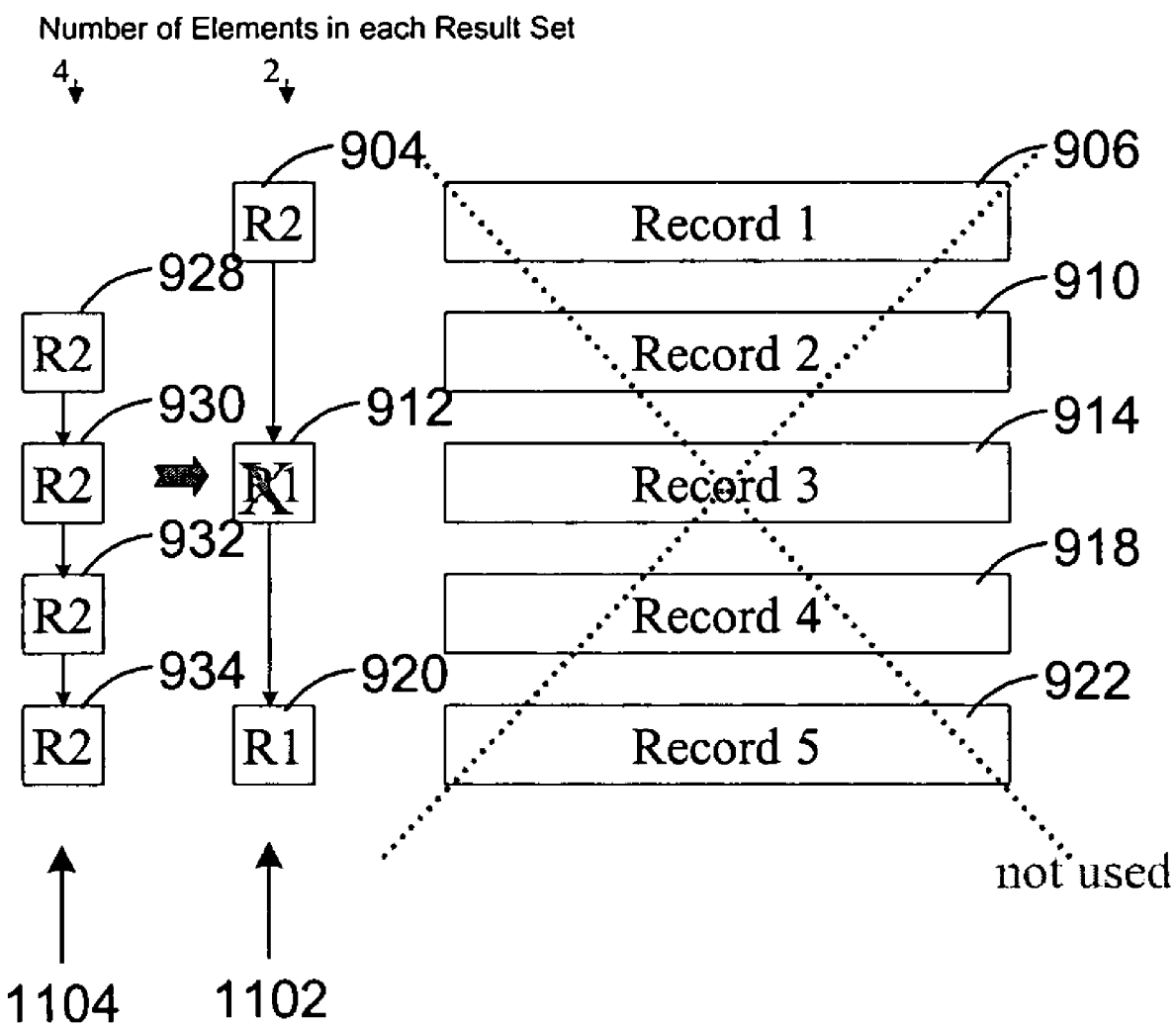
FIG. 13 is a third illustration of the result sets of FIG. 11 being used in a logical OR operation.

Having finished with element 904, the fast query system 100 determines whether additional guide elements exist within result set 1102 (1010 in FIG. 10). If so, as shown in FIG. 13, the system 100 selects another guide element 912 within result set 1102, and determines whether a corresponding element exists within result set 1104 (1006 in FIG. 10). In this case, such an element (specifically, the guide element 930) does exist in result set 1104, and so the fast query system 100 deletes the original element 912 from result set 1102 (1012 in FIG. 10). As part of the deletion process (1012), remaining elements in the result set 1102 may be strung together with pointers, as needed, so as to maintain an integrity of the (revised) list of elements in that result set as elements are deleted therefrom (1014 in FIG. 10). Then, a counter associated with result set 1102 is reduced by one (1016 in FIG. 10). In this way, intersection element(s) of both result sets may be removed.

Figure 14:
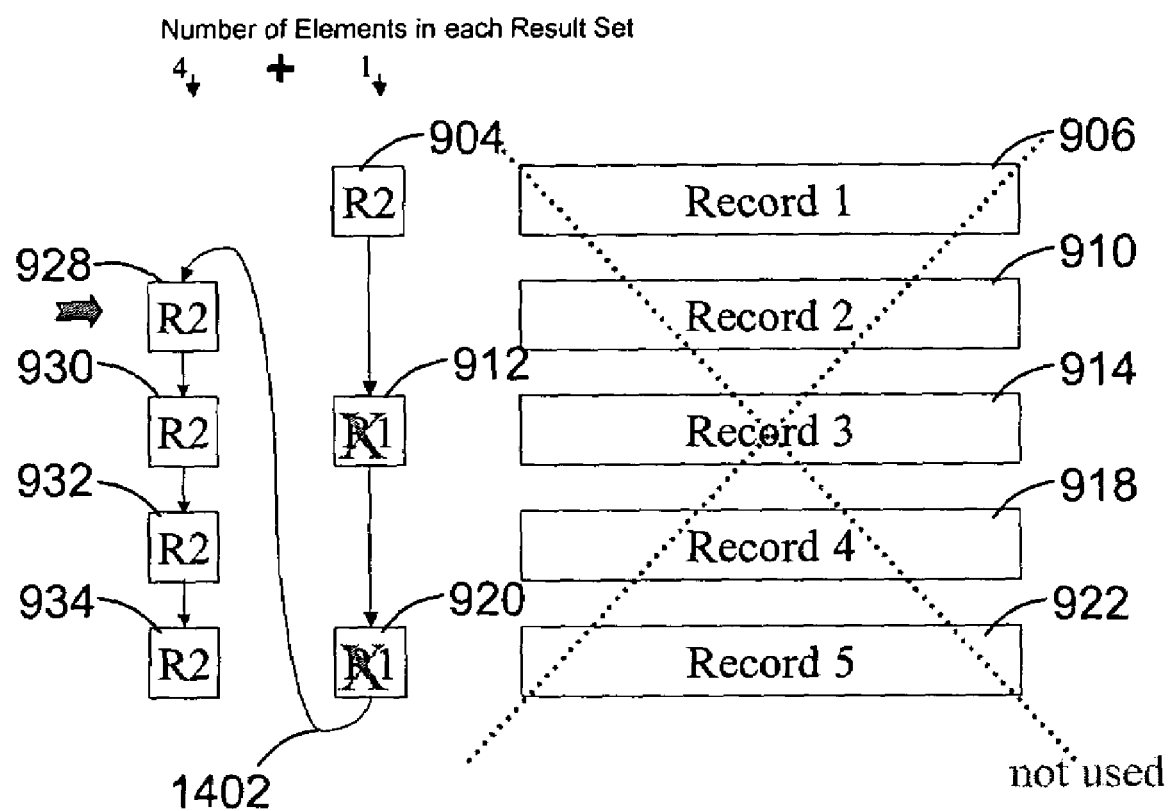
FIG. 14 is a fourth illustration of the result sets of FIG. 11 being used in a logical OR operation.

The system proceeds in this manner until all of the elements within result set 1102 have been checked, which results in the configuration shown in FIG. 14. In this case, as shown, element 920 is also deleted from result set 1102. When all the elements from result set 1102 have been considered (and intersection elements removed), then a new pointer 1402 is constructed which links all remaining, re-named elements from (former) result set 1102 to the first element 928 of result set 1104 (1018 in FIG. 10).

Figure 15:
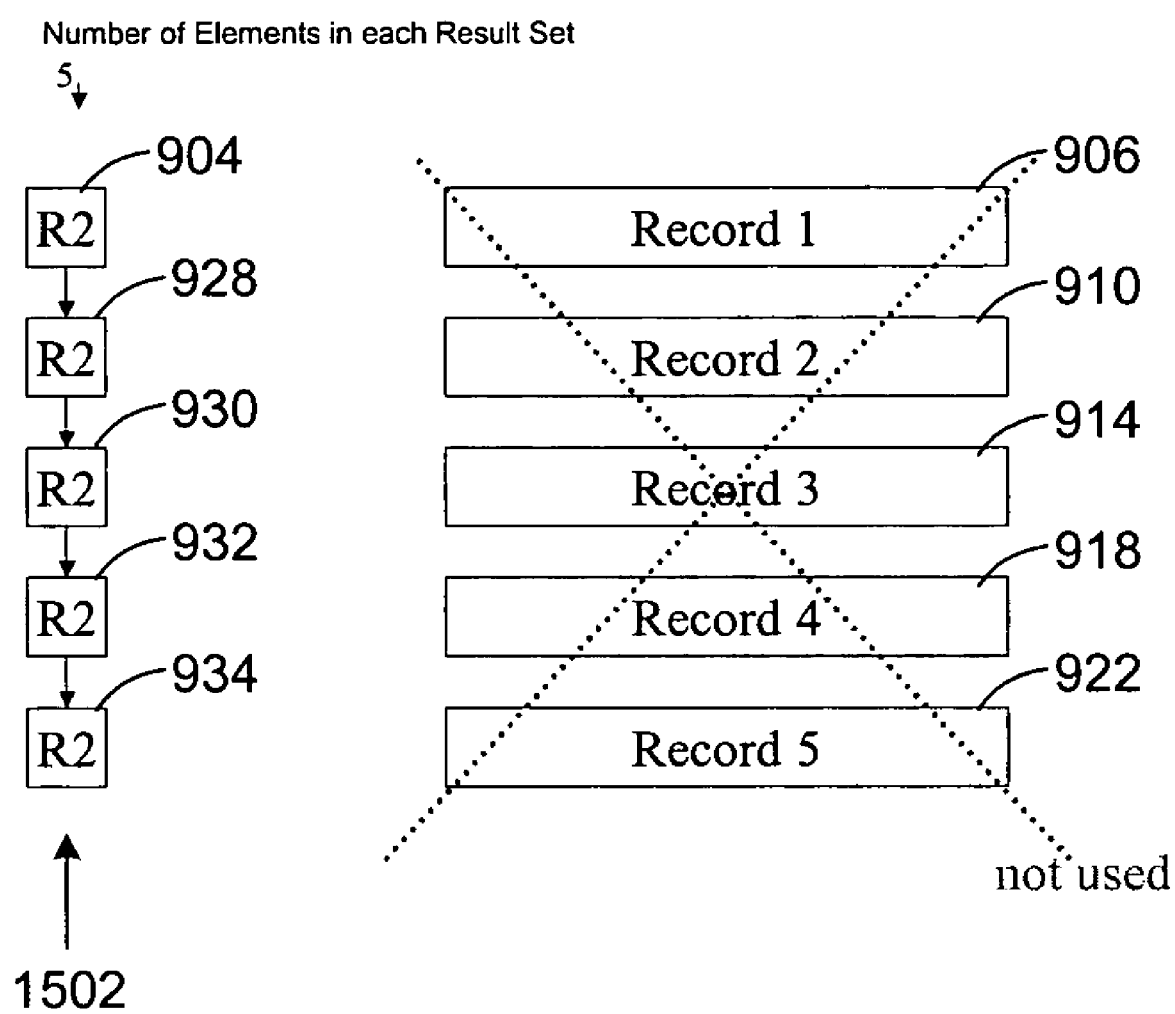
FIG. 15 is a fifth illustration of the result sets of FIG. 11 being used in a logical OR operation.

As shown in FIG. 15, a result of the above-explained operation is a single result set 1502 with the same name (i.e., result set ID) as the original result set 1104 (referred to herein by a different name, 1502, for clarity). Since the counters for the number of elements in the two result sets 1102 and 1104 have been updated throughout the logical OR operation, as described above, the number of elements in the final result set 1502 is merely the sum of the number of elements in each of the result sets just before the operation. As shown in FIG. 14, one element (904) remains in result set 1102, and four elements (928, 930, 932, and 934) remain in result set 1104. Thus, the final result set 1502 contains 4+1=5 elements in final result set 1502. This count result can be reported to a requesting application (i.e., the application inputting the original query) as the number of records matching a Boolean query.

As referred to above, a remaining final result set such as the result set 1502 may represent a final result for a query, or an intermediate result of a subquery. It may be combined again with further result sets. A complex query consisting of several nested subqueries may be evaluated recursively, by combining the result sets of subqueries with the result sets of other subqueries. This process may continue until all levels of brackets (i.e., subqueries) have been resolved. At the end of the process(es), one final result set is left, and a number of elements in this final result set (as reported by its counter) corresponds to the number of hits for the query as a whole.

The discussion above related to FIGS. 9-15 relates to the logical OR operation. Regarding the logical AND operation, there are multiple techniques for implementation, two examples of which are discussed below.

One example of how to process a logical AND operation is based on what is referred to herein as the "lean AND" operation. In the lean AND, only a single condition need be combined with a result set, where the result set may be itself the result of a complex query or subquery. Thus, the query for a lean AND might have a syntax such as "(<complex Subquery>) AND Condition." The lean AND also may be used within a chain of conditions combined with AND at the same query or subquery level, for example, a query such as "C1 AND C2 AND . . . AND Cn," where Cn refer to conditions.

Figure 16:
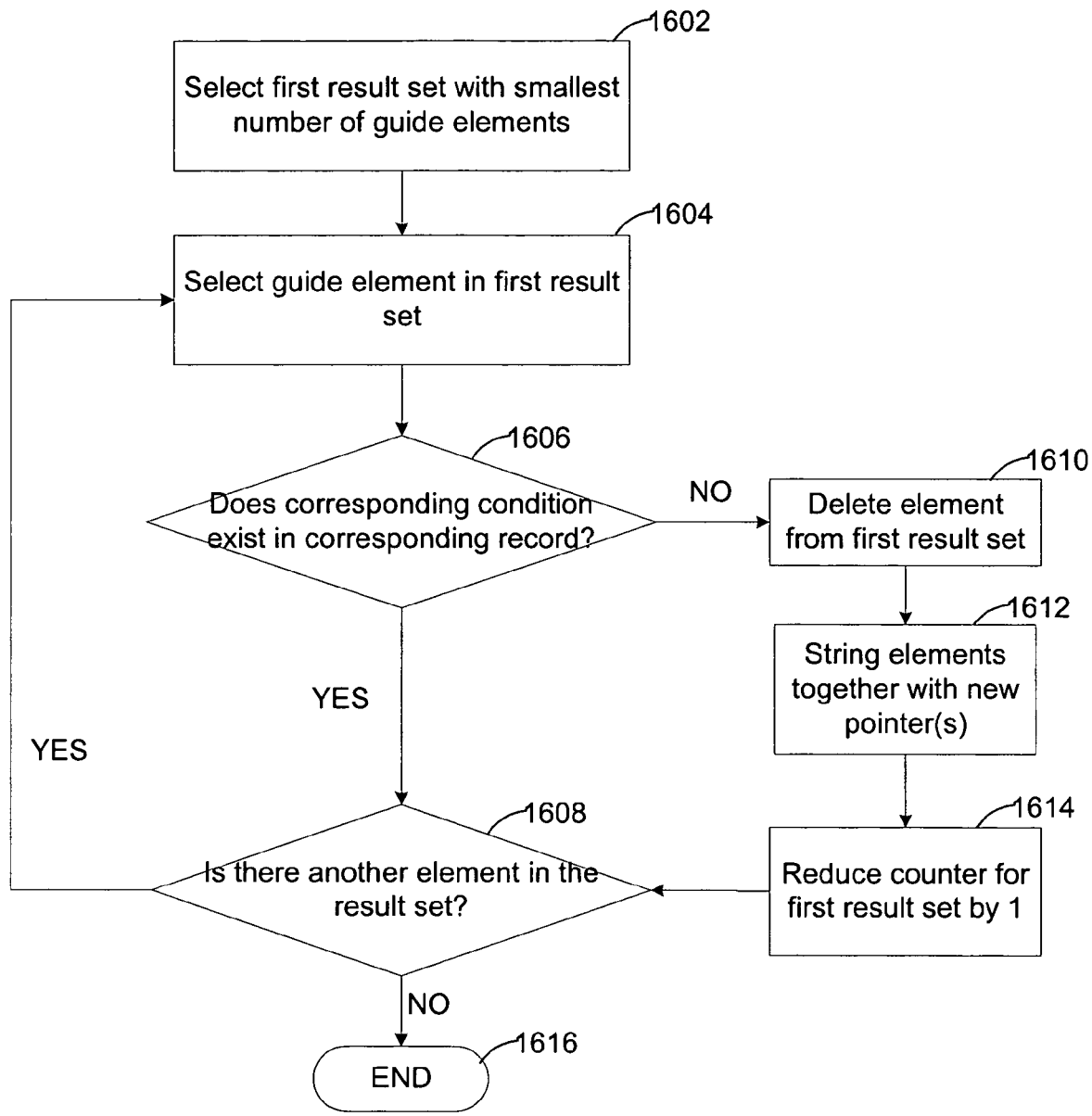
FIG. 16 is a flowchart illustrating an operation of a logical lean AND operation.

FIG. 16 is a flowchart illustrating an operation of a logical lean AND operation. FIG. 16 is referenced below with respect to FIGS. 17–19. In the examples below illustrating a lean AND operation, it is assumed that the query is a chain of conditions, such that the query is of the form, "C1 AND C2 AND . . . AND Cn," where Cn are Conditions.

As discussed above with respect to the logical OR operation, the fast query system 100 is able to quickly and easily select the condition from this chain of conditions which has a result set with the smallest number of elements, i.e. the highest selectivity. The number of hits in the intersection set of all conditions, by definition of the logical AND operation, cannot be larger than the number of hits for the condition with the highest selectivity.

Figure 17:
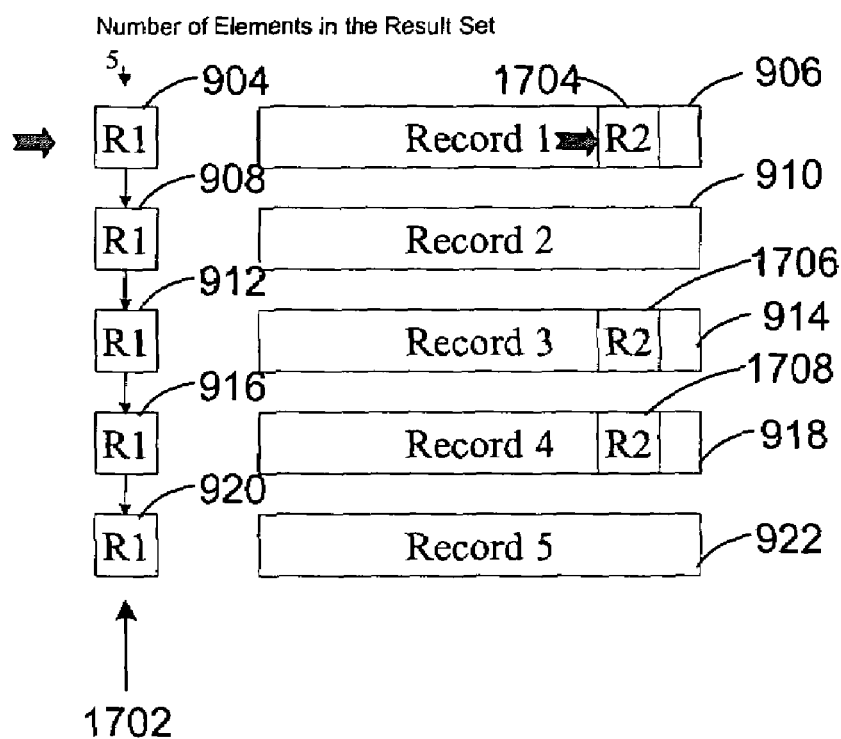
FIG. 17 is a second illustration of result sets built using the technique of FIG. 8.

Thus, as shown in FIG. 17, a result set 1702 is created for the selected condition (i.e., the condition with the highest selectivity) (1602 in FIG. 16). Next, the first guide element 904 is selected (1604 in FIG. 16), and its corresponding record 906 is checked to see if the other condition(s) are met within an appropriate Info Cell 1704 within the body of the record 906 itself (1606 in FIG. 16).

In this regard, it should be understood that in the context of the lean AND, time needed to instantiate an entire result set (i.e., each guide element within the result set) may surpass the time needed to simply check a record (i.e., Info Course) to see whether a particular condition is met therein, particularly given the fact that result set 1702 is already the condition with the highest selectivity. Thus, no explicit secondary result set is built; rather, the records associated with result subset 1702 are individually checked to find matching condition(s) 1704, 1706, and 1708 contained within records 906, 914, and 918.

In the case of guide element 904, corresponding condition is met within record 906, and so the system 100 next checks to see whether there is another element within result set 1702. In the case of FIG. 17, there is (specifically, element 908), and so the system 100 selects that element for processing (1604 in FIG. 16).

Figure 18:
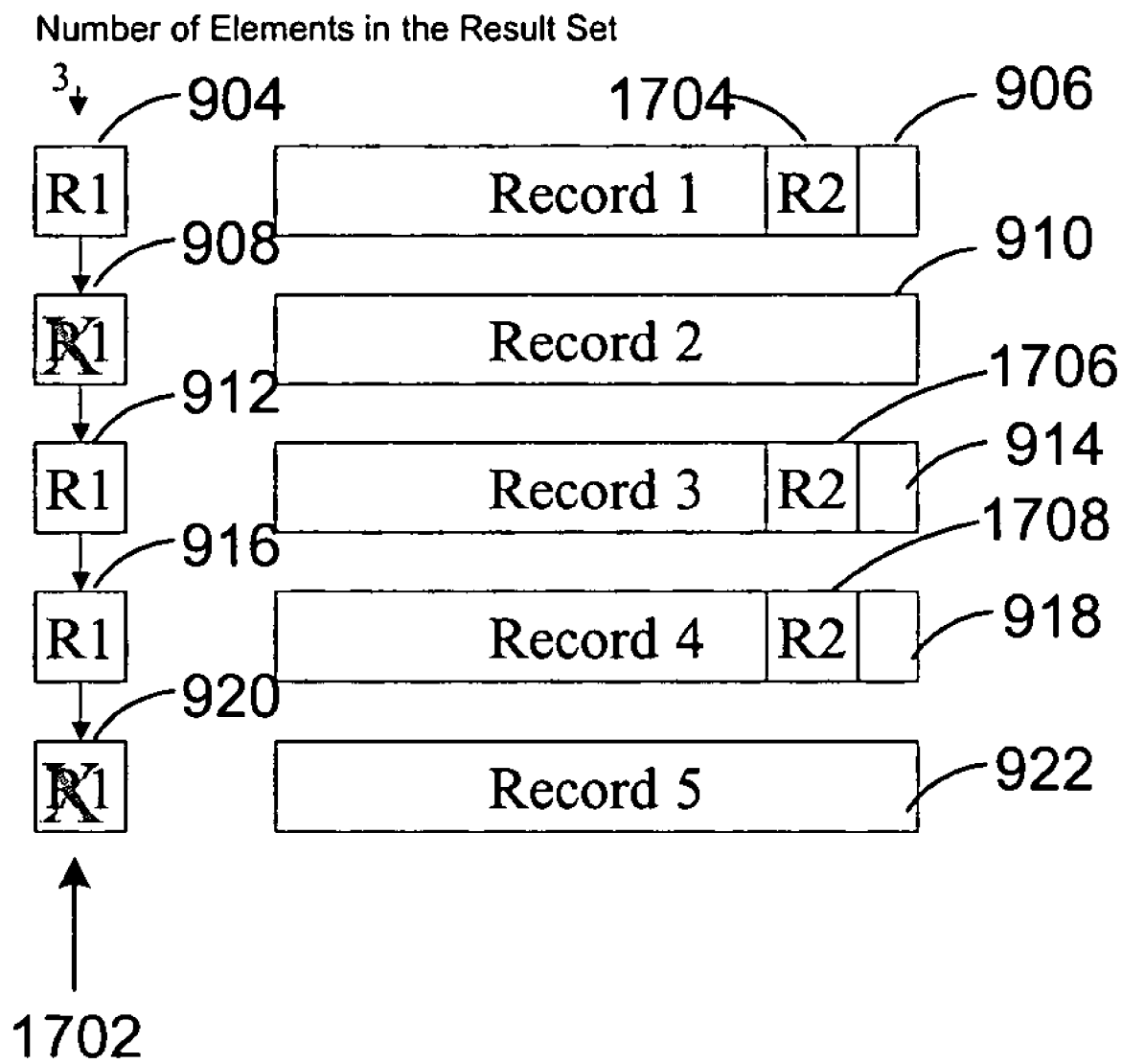
FIG. 18 is a first illustration of the result sets of FIG. 17 being used in a lean AND operation.

In the case of element 908, the condition is not met within its corresponding record 910 (1606 in FIG. 16). Thus, as shown in FIG. 18, element 908 is deleted from result set 1702 (1610 in FIG. 16). In this case, remaining elements are strung together, perhaps as part of the deleting process, such that a predecessor of a deleted element is made to point directly to the deleted element's successor (1612 in FIG. 16). In this way, an integrity of the result set is maintained. Then, a counter associated with result set 1702 is reduced by one, accordingly (1614 in FIG. 16).

Figure 19:
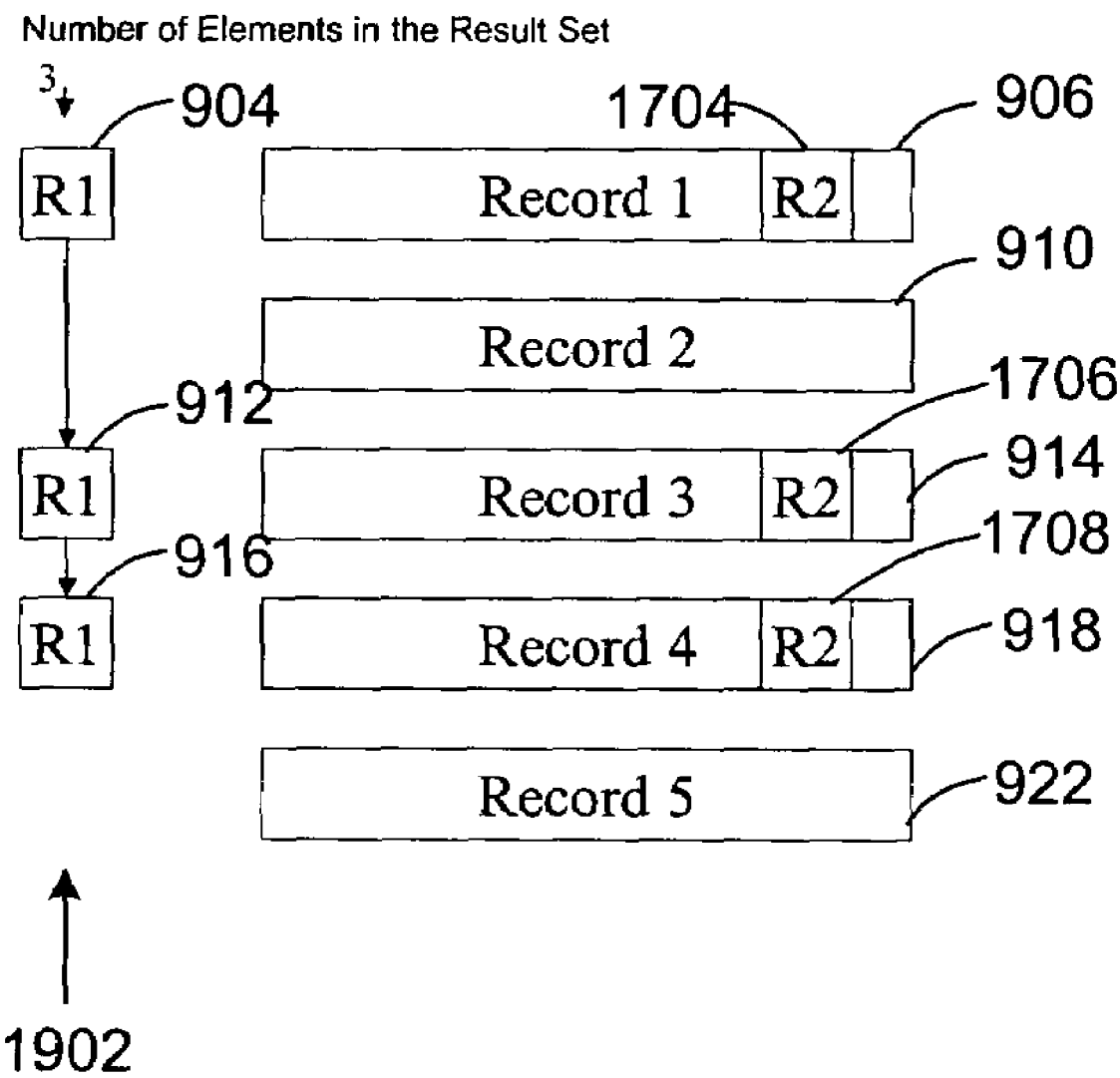
FIG. 19 is a second illustration of the result sets of FIG. 17 being used in a logical "lean AND" operation.

The fast query system 100 proceeds through the remaining elements of result set 1702, keeping elements 912 and 916, and deleting element 920. Upon checking element 920 and its corresponding record, 922, the system determines that there are no more elements within result set 1708, and the process ends (1616 in FIG. 16) with a final result set 1902, as shown in FIG. 19.

In the examples of FIGS. 16–19, there may only be the two conditions; i.e., the conditions which provide the result set 1702, as well as matches in records 906, 214, and 918. Such conditions might be, for example, "first name is John" AND "last name is Smith." If there are more than two conditions in the chain of conditions, then a check is performed for each of the additional conditions. For example, in a query C1 AND C2 AND C3 AND C4, a result set for the most selective condition is instantiated within a plurality of guide elements, and, for each guide element, the three other conditions are checked. If at least one condition does not match, the corresponding Guide Element is deleted from the selected result set, as described above.

At the end of a lean AND process such as that just described, the final result set 1202 flags only matching records, and the counter for the result set 1702 contains the correct number of hits, which may be reported to an application.

In order to run a normal AND operation, two explicit result sets may be used, and the records themselves might not be needed. The two result sets might each be a result of a complex query or subquery (i.e., subqueries containing potentially any Boolean query), where the two subqueries have to be combined after each of them has been evaluated separately. Such a query might have a syntax like: (<Subquery 1>) AND (<Subquery 2>) AND . . . AND (<Subquery n>). Of course, the lean AND could also be performed using the normal AND technique of building multiple explicit result sets.

Figure 20:
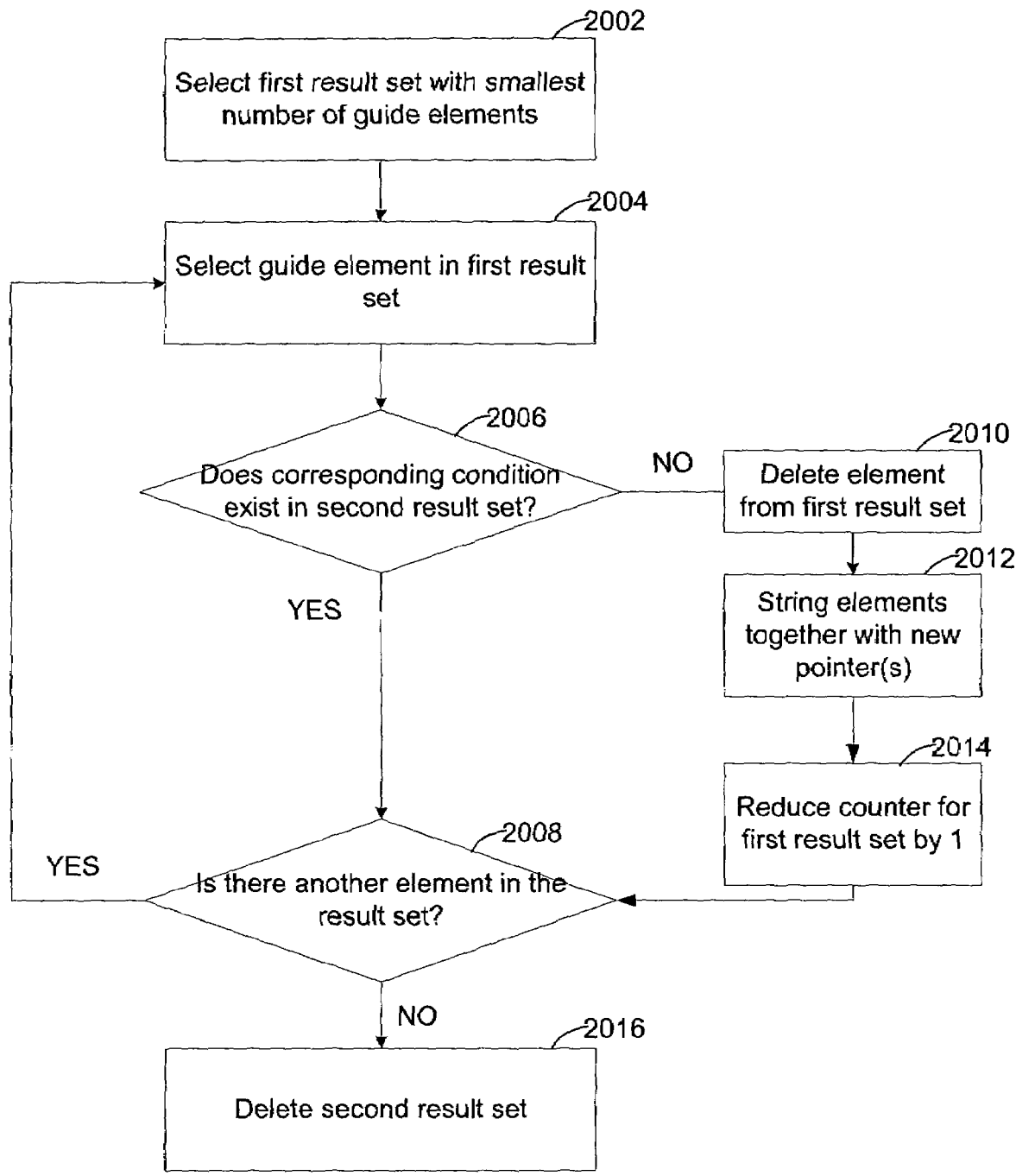
FIG. 20 is a flowchart illustrating an operation of a logical AND operation.

FIG. 20 is a flowchart illustrating an operation of a logical AND operation. FIG. 20 is discussed below with respect to FIGS. 21–23.

Figure 21:
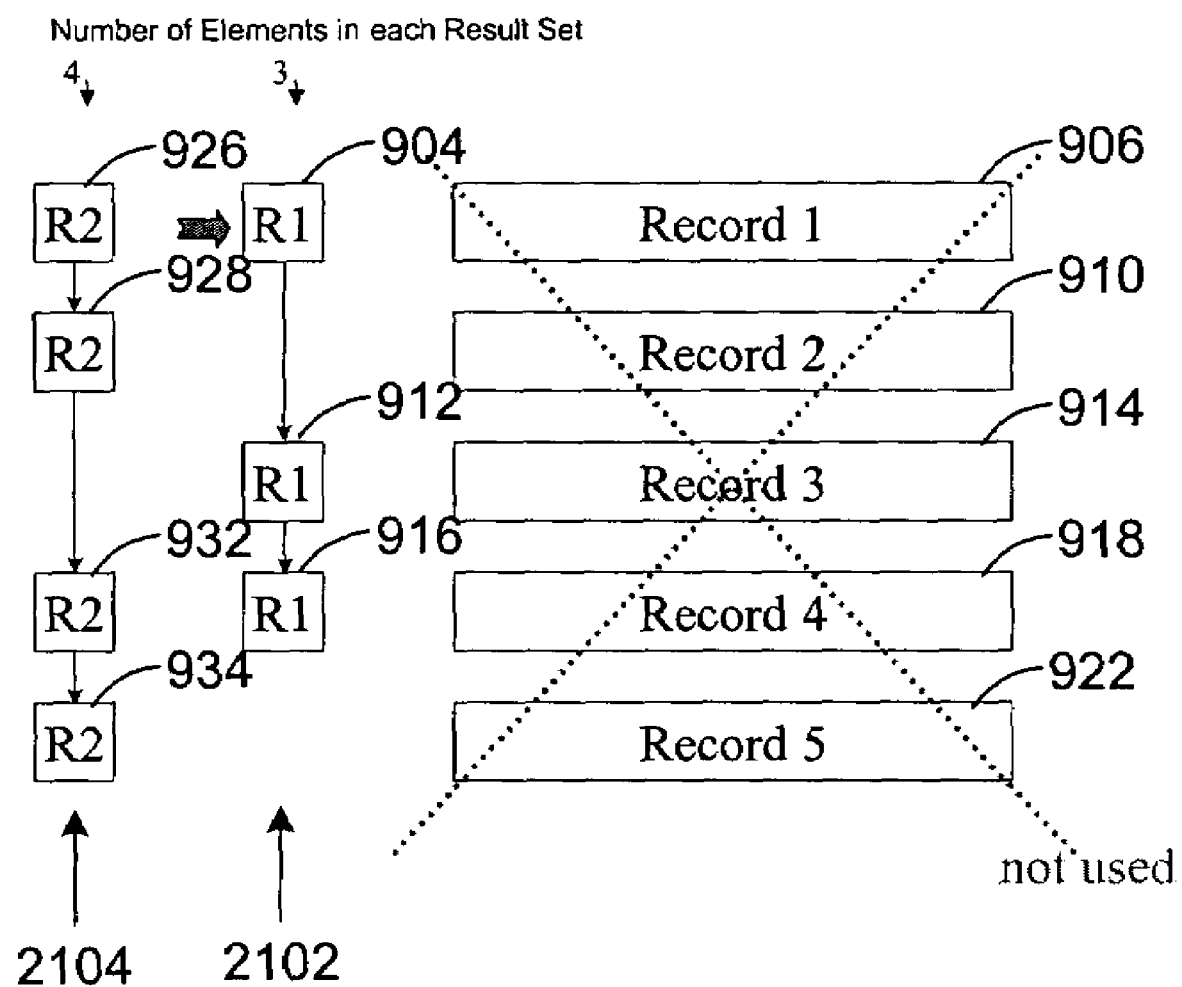
FIG. 21 is a third illustration of result sets built using the technique of FIG. 8.

As discussed above with respect to the logical OR and lean AND operations, the fast query system 100 selects a result set 2102 with the smallest number of elements, i.e. the highest selectivity (2002 in FIG. 20). Next, the first guide element 904 is selected (2004 in FIG. 20), and corresponding guide element 926 in a result set 2104 is checked (2006 in FIG. 20). Accordingly, as shown in FIG. 21, records 906, 910, 914, 918, and 922 are not needed to perform the logical AND operation.

In the case of guide element 904, the corresponding guide element 926 exists in result set 2104, and so the system 100 next checks to see whether there is another element within result set 2102. In the case of FIG. 21, there is (specifically, element 912), and so the system 100 selects that element for processing (2004 in FIG. 20).

Figure 22:
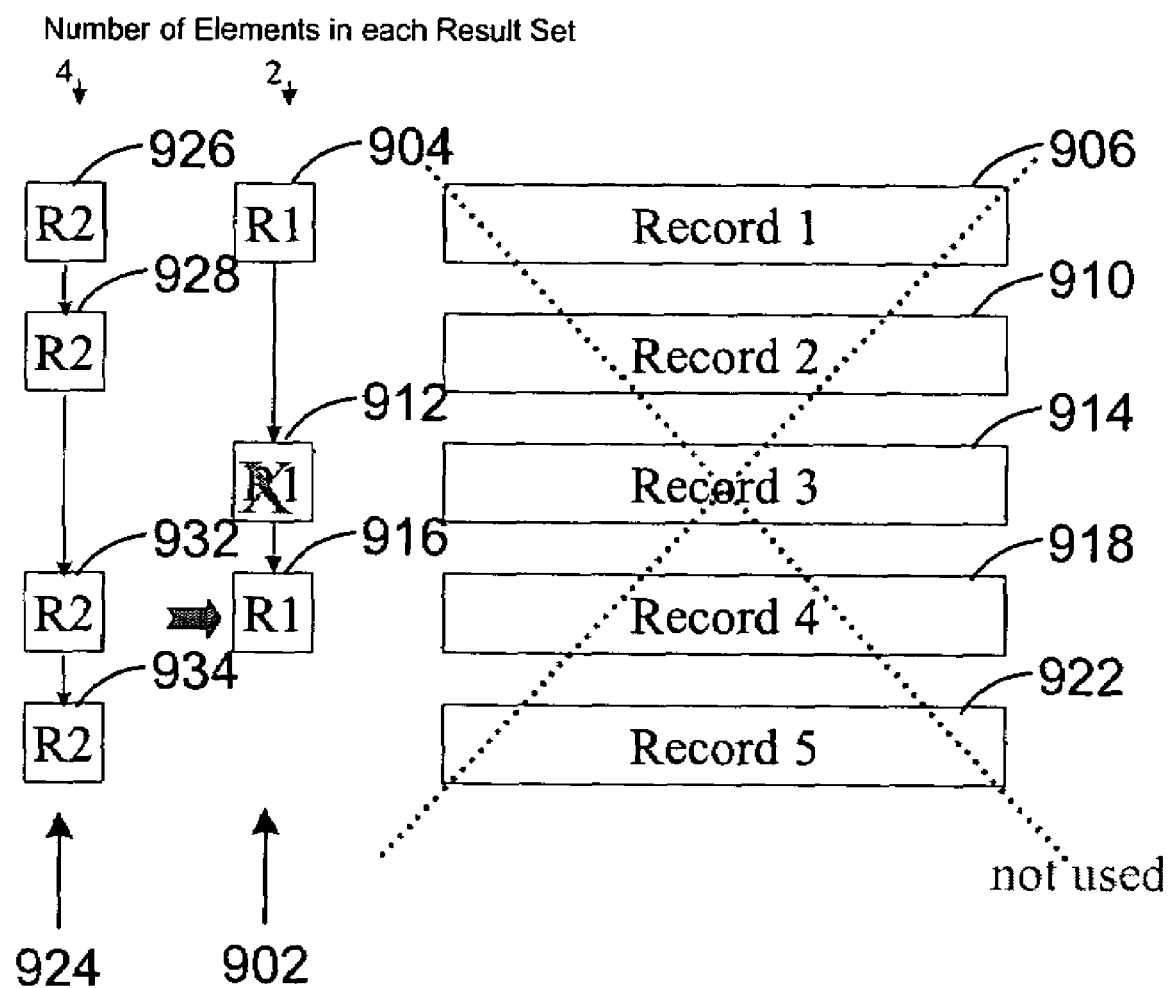
FIG. 22 is a first illustration of the result sets of FIG. 21 being used in a logical AND operation.

In the case of element 912, no corresponding element exists within result set 2104 (2006 in FIG. 20). Thus, as shown in FIG. 22, element 912 is deleted from result set 2102 (2010 in FIG. 20), and element 204 is connected to element 216 (2012 in FIG. 20) in FIG. 23. In this case, a counter associated with result set 2102 is reduced by one, accordingly (2014 in FIG. 20).

Figure 23:
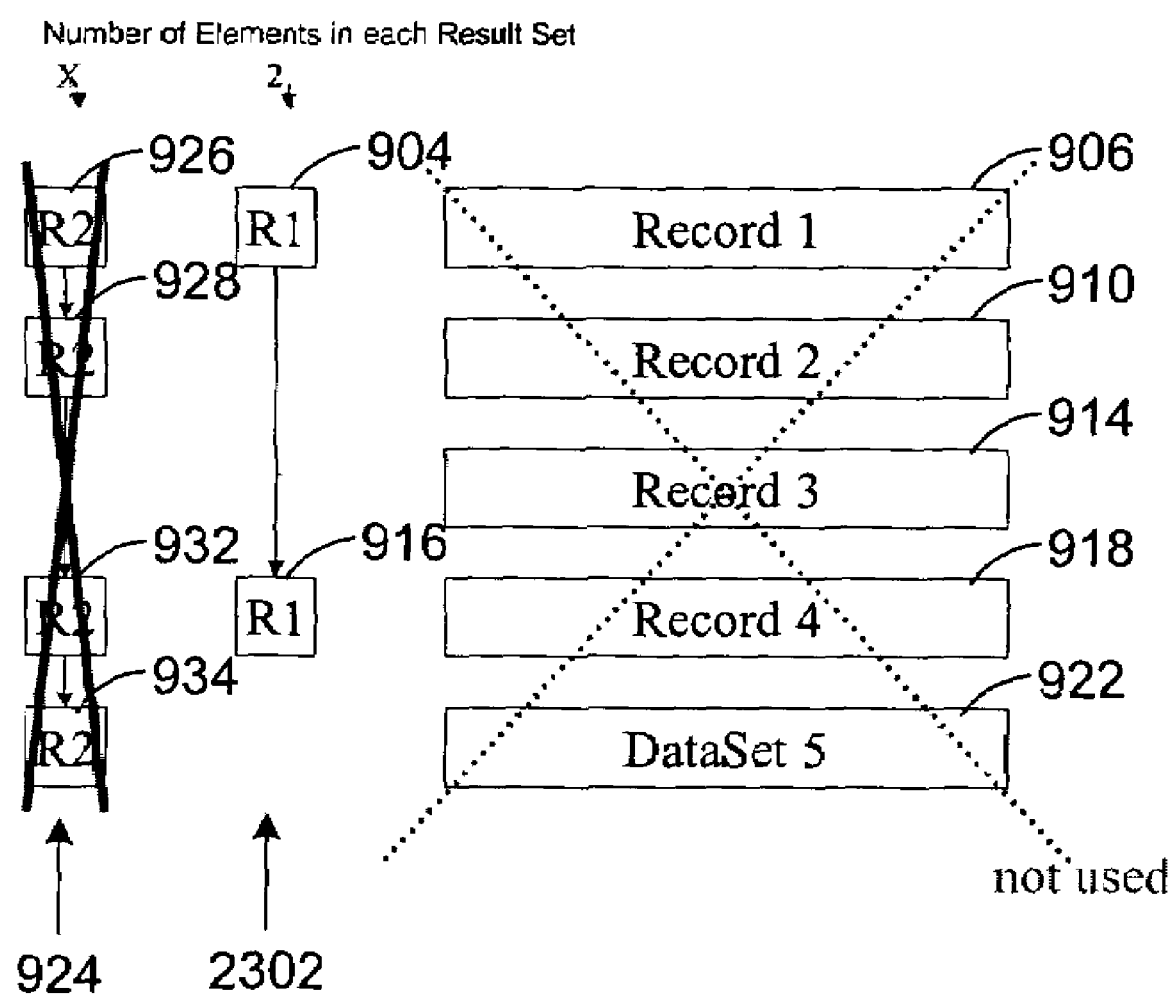
FIG. 23 is a third illustration of the result sets of FIG. 21 being used in a logical AND operation.

The fast query system 100 proceeds through the remaining elements of result set 1702, keeping only element 916. Upon checking element 916, the system determines that there are no more elements within result set 2102, and, as shown in FIG. 23, deletes the remaining elements of result set 2104 (2016 in FIG. 13) to leave a final result set 2302.

At the end of an AND process such as that just described, the final result set 1602 flags only matching records, and the counter for the result set 2302 contains the correct number of hits, which may be reported to an application.

Figure 25:
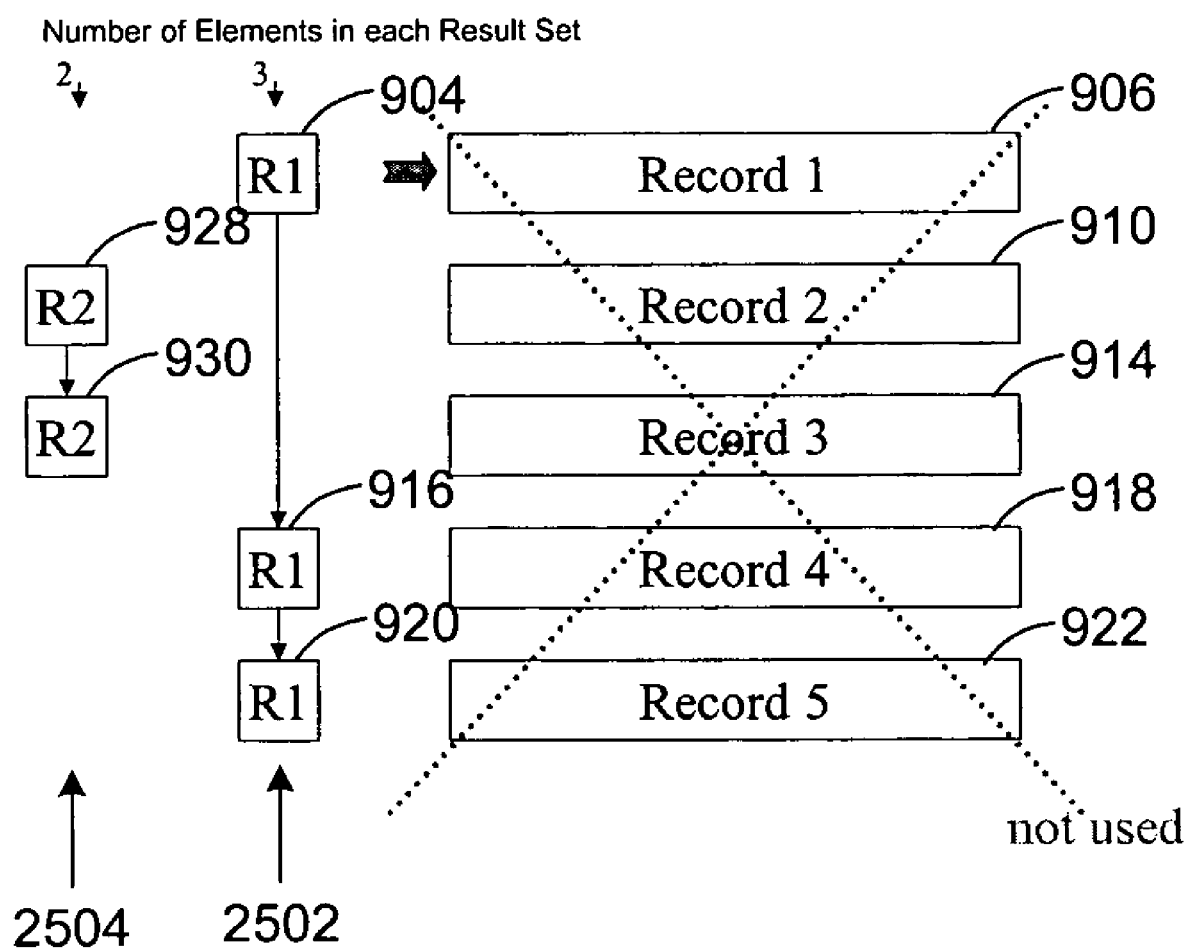
FIG. 25 is a fourth illustration of result sets built using the technique of FIG. 8.
Figure 26:
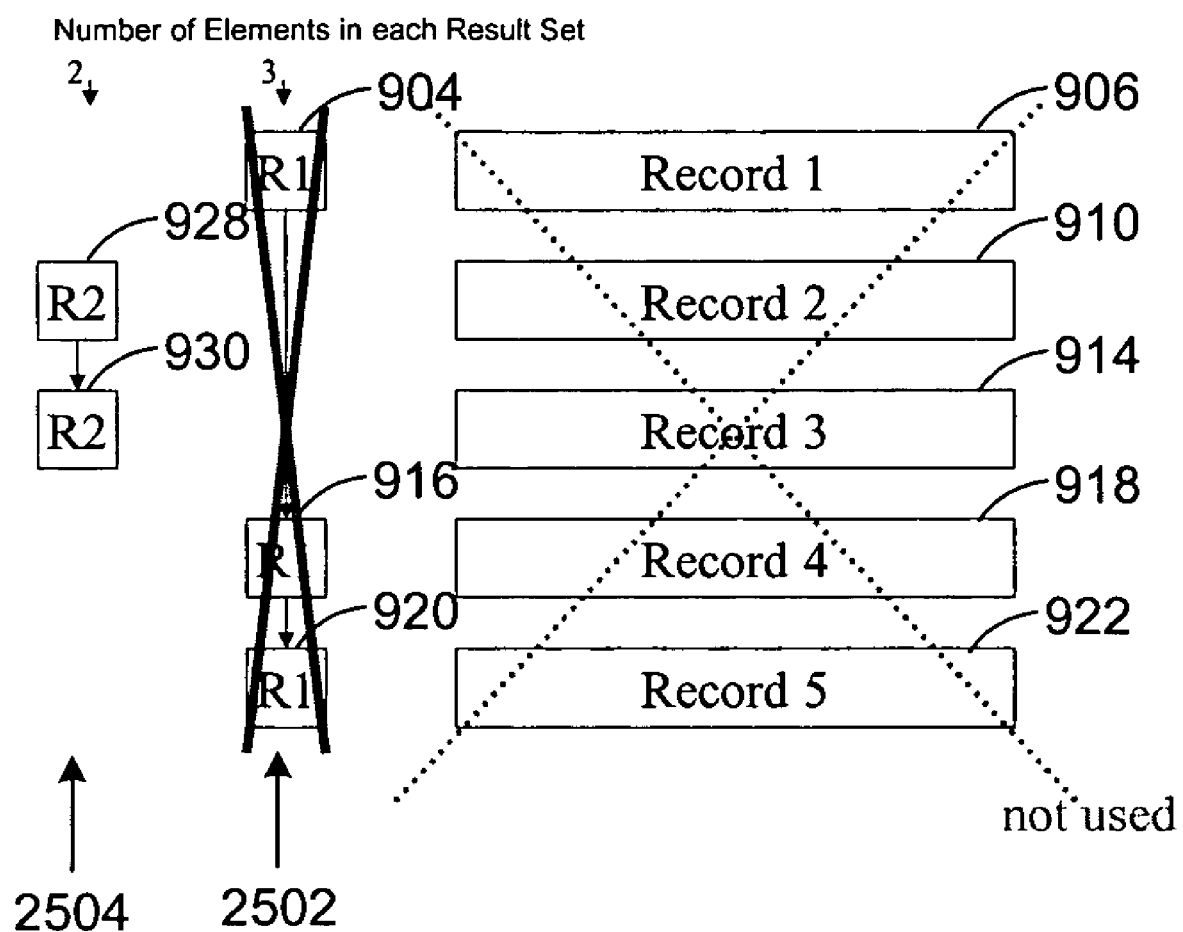
FIG. 26 is an illustration of the result sets of FIG. 25 being used in a logical NOT operation.

As a final example of a logical operation performed using the guide elements and related techniques discussed above, techniques for performing a logical NOT operation are discussed below with respect to FIGS. 24–26.

Figure 24:
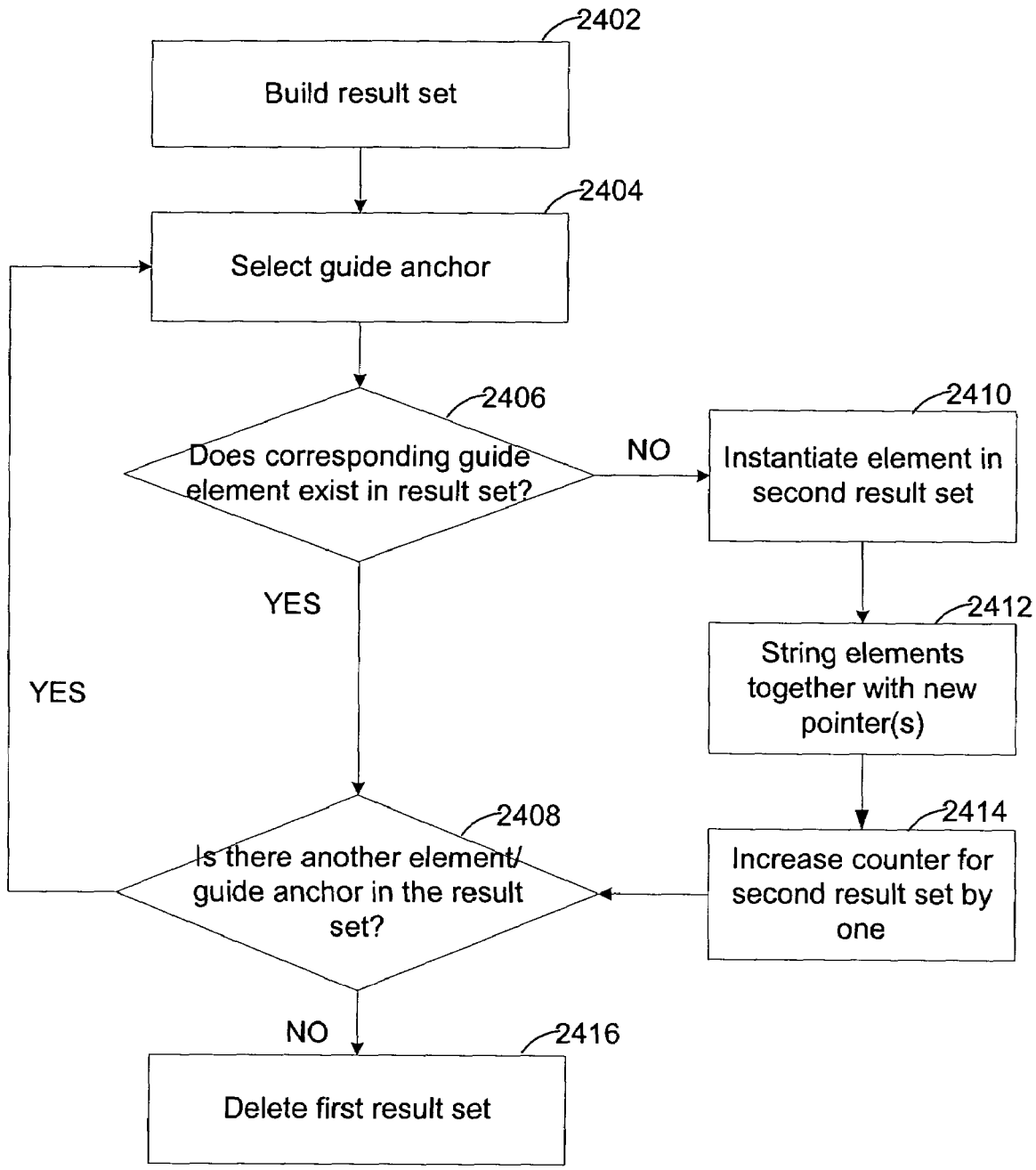
FIG. 24 is a flowchart illustrating an operation of a logical NOT operation.

Specifically, FIG. 24 is a flowchart illustrating an operation of a logical NOT operation, as discussed below with respect to FIGS. 25 and 26. For example, for a logical operation such as "NOT first name is John," a result set 2502 in FIG. 25 of "first name is John" is built (2402 in FIG. 24). Then, for a selected result set such as a result set 2502, the fast query system 100 examines a first anchor and/or guide anchor (see FIG. 8) associated with the set of records 906, 910, 914, 918, and 922; in this case, this corresponds to a guide anchor associated with record 906 (2404 in FIG. 24).

If a corresponding guide element exists within result set 2502 (which is true in this example, i.e., 904) (2406 in FIG. 24), then the system next determines whether another guide anchor (record) remains to be checked (2408 in FIG. 24). In the next iteration, it is determined that no guide element exists which corresponds to record 910. Thus, guide element 928 within a new result set 2504 is instantiated (2410 in FIG. 24). Pointer(s) may be used to connect the guide element 928 to elements already in the result set 2504, if any (2412 in FIG. 24).

Then, a counter associated with this result set is created and/or increased by one (2414 in FIG. 24). The process continues, instantiating the element 930 (2410) connected to the element 928 by a pointer (2412) and increasing the counter by one (2414). When no more elements/guide anchors remain to be checked, the original first result set 2502 is deleted, as shown in FIG. 26 (2416 in FIG. 24).

As the number of guide elements and result sets grows, in proportion to a number of records and/or queries, it may eventually become impracticable to utilize some or all of the techniques discussed above. For example, in the case where a number of records is well into the millions, result sets may themselves contain millions of elements. On a 64 bit architecture, one pointer address occupies 64 bits (8 bytes). Each guide element has 2 or more pointers, plus the content of the guide element. Therefore, one guide element may occupy several hundred bytes, so that a result set containing millions of guide elements may occupy memory in the range of hundreds of megabytes. This memory usage is in addition to the various data and related tree structures described above, which also reside in memory.

Moreover, the techniques described above typically run through result sets sequentially, checking elements individually in order to perform logical operations. Again, as numbers of guide elements within result sets grow into the millions, processing time for performing these operations may grow into the range of several seconds for performing a single logical combination. Such processing times may be unacceptable for a system such as fast query system 100.

In order to provide alternative techniques for performing logical operations, the use of bitmaps is discussed below with regard to FIGS. 27–30. As explained below, the use of guide elements versus the use of bitmaps in performing logical combinations may be selected according to various criteria, and either of the two techniques can be used in a given situation to obtain the same result. More specifically, the use of guide elements, as just described, may become problematic for large result sets; in this case, bitmaps may be advantageous. In contrast, for smaller result sets, the use of bitmaps might result in needless and time-consuming searches through largely-empty bitmaps. Therefore, depending on, for example, the size of the result sets, a decision may be made to switch between the two techniques on an as-needed basis. More specifically, the fast query system itself may be programmed to perform such a switch, thereby optimizing itself for peak performance.

Figure 27:
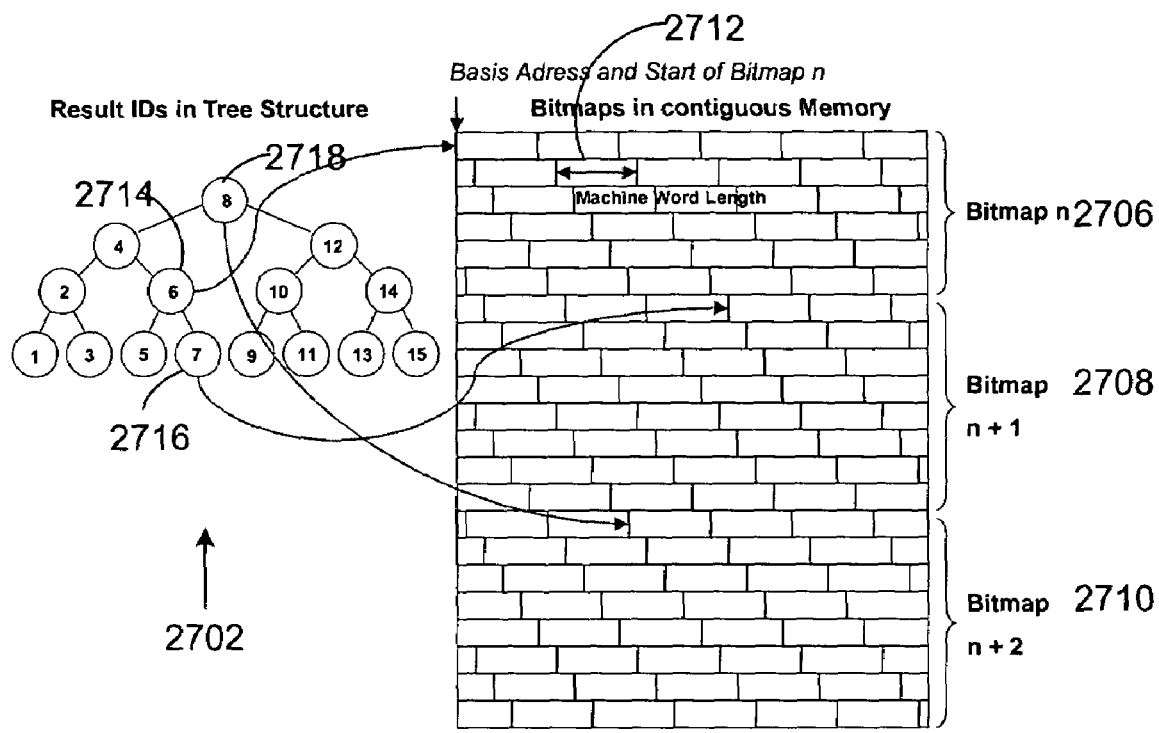
FIG. 27 is an illustration of a second technique for building result sets to be used in performing logical combinations.

FIG. 27 is an illustration of a second technique for building result sets to be used in performing logical combinations. Specifically, FIG. 27 illustrates the use of a bitmap(s) in performing logical combinations.

In FIG. 27, at least a part of a tree structure 2702 of result set IDs is mapped to a bitmap 2704, using pointers. The bitmap in the example of FIG. 27 includes three specific bitmaps, i.e., a bitmap "n" 2706, a bitmap "n+1" 2708, and a bitmap "n+2" 2710. Each bitmap 2706, 2708, and 2710 includes a plurality of machine words such as a machine word 2712, and each machine word contains a plurality of bits. In this way, a particular bit within a particular machine word may be set from "0" to "1," to thereby indicate that a Result ID from within tree structure 2702 is a part of a result set.

Thus, each bitmap corresponds to a result set having a particular ID, and these IDs are stored in the tree structure 2702 (or other structure, such as a linear list). In FIG. 27, a result set ID 2714 corresponds to bitmap 2706, while result set ID 2716 corresponds to bitmap 2708, and result set ID 2718 corresponds to bitmap 2710. Each bit set to "1" within the bitmap(s) provides a dynamic flag marking a particular data record (i.e., similar to a guide element) within the bitmap (result set).

Figure 28:
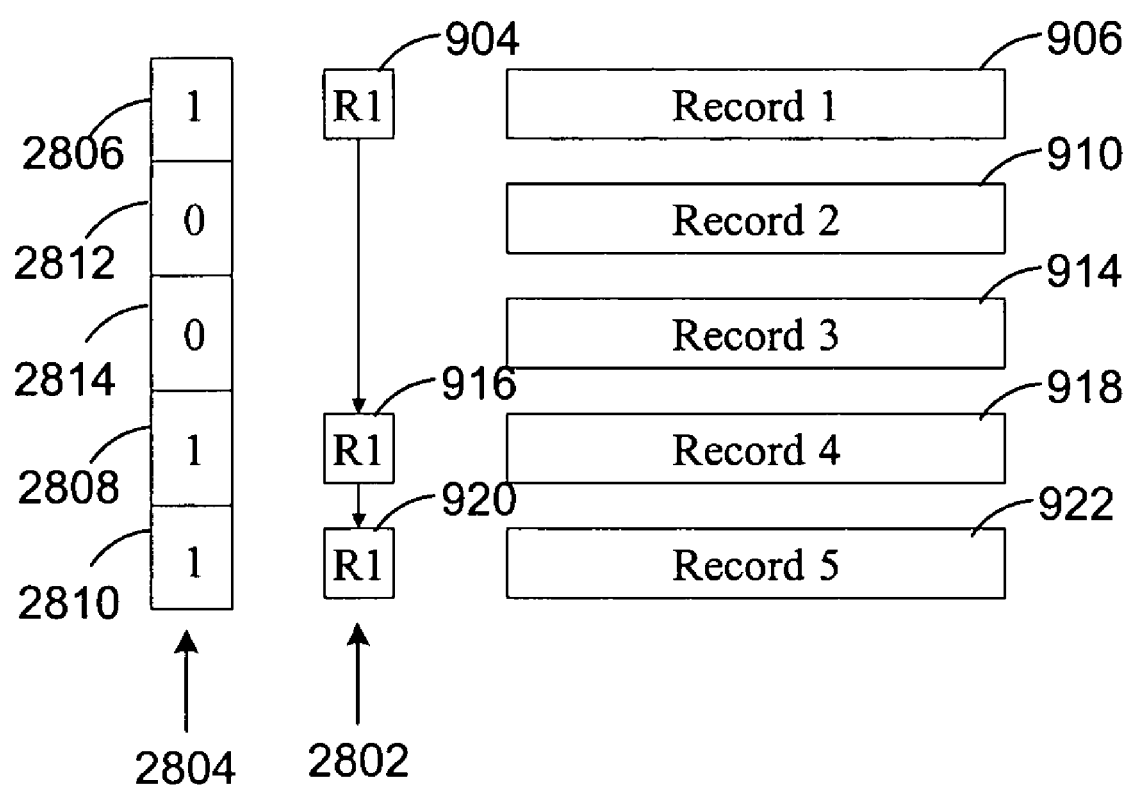
FIG. 28 is an illustration comparing a result set built with the techniques of FIG. 8 to the same result set built with the technique of FIG. 27.

FIG. 28 is an illustration comparing a result set built with the techniques of FIG. 8 to the same result set built with the technique of FIG. 27. In FIG. 28, a result set including records 906, 918, and 922 is expressed in two ways: first, as result set 2802 using guide elements 904, 916, and 920, and second, as result set 2804 using bits 2806, 2808, and 2810 set to "1."

It should be understood from FIG. 28 that, using the technique of building guide elements, no guide element is instantiated for records 912 or 916. In contrast, spaces 2812 and 2814 within a bitmap are inherently reserved as part of the bitmap, but are merely set to zero. It should also be understood that FIG. 28 is generally shown for illustrative purposes, and is not intended to imply that guide lists and bitmaps are to be used together.

In the example of FIG. 27, and depending on a particular hardware architecture being used, a machine word may be, for example, 32 or 64 bits in length. More generally, the algorithm works with any other length, e.g., 128 bits. As shown in FIG. 27, a bitmap is a contiguous concatenation of machine words in a sufficiently large area of memory. A bitmap contains the same number of bits as anchor elements, to account for the case when every anchor element (and thus data record) is included in the bitmap (result set). In other words, a bitmap is a maximum extent of a result set. As with guide elements (which use a circular, linked structure), many result sets may be kept in memory simultaneously, and, as with the guide elements, each result set (bitmap) is uniquely identified by a result set ID (stored in tree structure 2702).

As an example, in the case where 5 million records are loaded into main memory, 5 million anchor elements will also exist, so that one bitmap, e.g., bitmap 2706, is 5 million bits large. In this case, the bitmap occupies $5,000,000/8=625,000$ Bytes=610 KB. The 5 million bits correspond to $5,000,000/64=78.125$ machine words on a 64 bit hardware platform, and to $5,000,000/32=156,250$ machine words on a 32 bit hardware platform.

This example illustrates the point that a particular bitmap may include tens of thousands, or more, machine words, and this size is potentially limited only by an availability of memory and/or an addressability of the memory.

The bitmap(s) described herein can be used to perform essentially all of the functionality of the guide elements. For example, once a start address identifying a specific bitmap, such as bitmap 2706, is identified, then this bitmap can be used to count a number of records which match a particular query (i.e., a number of hits such as "number of customers named Smith=200"), and/or to return data to an application (such as an actual list of the customers named "Smith").

In order to obtain the number of hits for a query from a bitmap 2706, the bitmap 2706 will typically have a counter (not shown) containing a number of bits within the bitmap 2706 set to "1." To obtain this count, the fast query system 100 runs through all the machine words 2712 of the bitmap 2706. This process is faster than merely counting all bits directly, since, if a machine word has value "0," then all bits within the machine word are zero, and the next machine word can be checked. For machine words with value not zero, the number of bits set to "1" must be checked, which can be done by, for example, shifting the bits of a machine word in one direction, testing with bit masks performing a bitwise AND Operation, or by other methods. Each time a bit is found to be set to 1, a corresponding counter may be increased by one. At the end of this counting process, the counter contains the number of bits set to "1," which corresponds to the number of hits in the result set.

Figure 29:
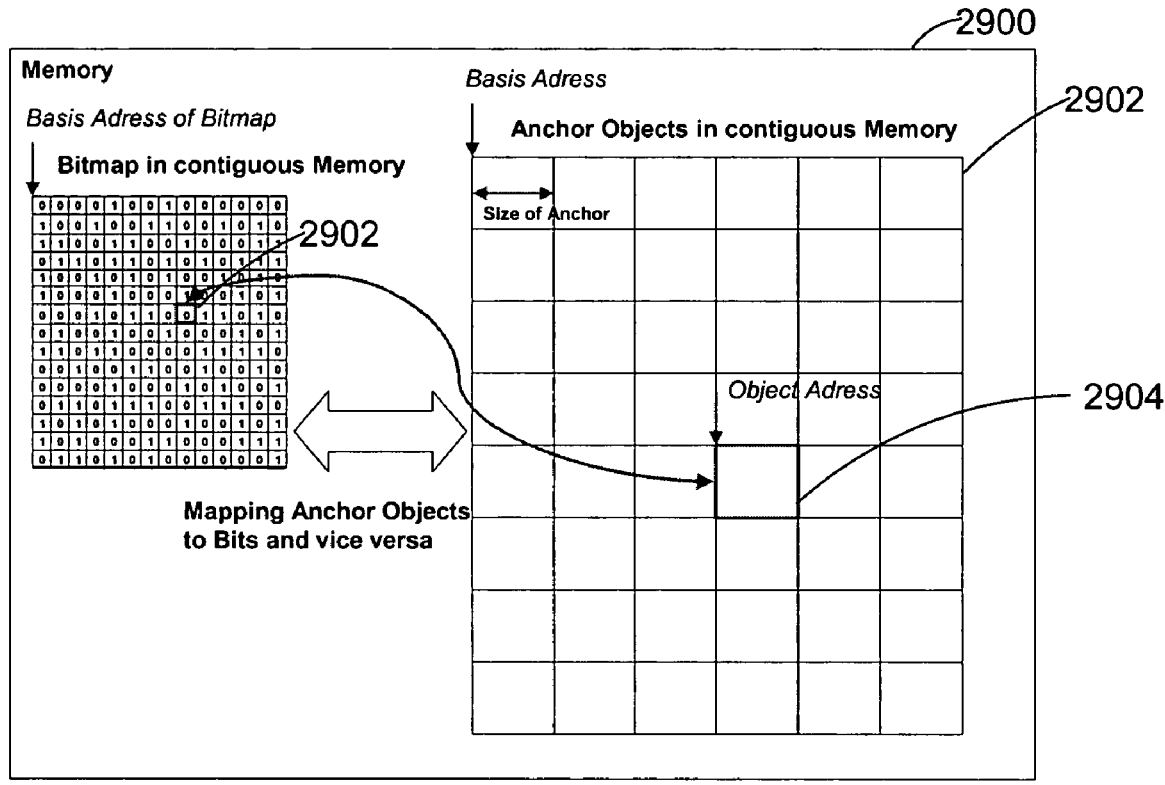
FIG. 29 is an illustration of a memory mapping technique used in the technique of FIG. 27.

FIG. 29 is an illustration of a memory mapping technique used in the technique of FIG. 27, which can be used to return data to an application. In FIG. 29, the bitmap 2704 is mapped to a plurality of anchors stored in a separate memory area 2905

Once a particular anchor object associated with a data record (Info Course) is found, the desired attribute (i.e., specific node/data in an attribute or Info Type tree) can be found, and the desired data can be read from the node and output using a send buffer structure or other technique described above. Techniques for finding an anchor object/data record corresponding to a particular bit are discussed below.

Regarding the ability of bitmap techniques to find a corresponding anchor object/data reocrd, it should be understood that bitmaps, unlike guide elements, are not generally linked to anchor elements (and thereby to data records, i.e., Info Course(s)) by pointers. Rather, a bit within a bitmap indicating that a particular record is a part of a result set are linked to that record using a memory mapping rule in conjunction with a relative addressing scheme.

In this case, an algorithm using relative addresses can be used to relate a particular bit to a particular anchor object, assuming that the anchor elements and bitmaps should reside in contiguous memory areas, as shown in FIG. 29.

More particularly, a specific bit 2906 located in a machine word may have bit number K. The machine word that includes bit number 2906 may have a memory address M. The bitmap 2706 itself has a start address SA. Thus, the number B of the specific bit in this example is calculated as B=(M−SA)*64+K for 64-bit long machine words, and B=(M−SA)*32+K for 32-bit long Machine Words. In this case, if the "Bth" bit of the bitmap is thus determined to be set to 1, then the record corresponding to the Bth anchor element will be considered to be part of the result set.

The corresponding anchor 2904 is found in the anchor object memory area using the following addressing scheme: all anchor objects reside in a memory area with basis address C. The Size S of an Anchor Object is presumed to be known. So, the address of the specific anchor object 2904 can be determined to be A=C+B*S. A pointer 2908 set to address A points exactly to the requested anchor object.

Conversely, to set up a bitmap for a node within an attribute tree associated with a particular anchor object/data record (i.e. to set an appropriate bit to "1"), the reverse of the above solution may be used. Specifically, considering that an anchor object 2904 has an address A, where a basis address of the memory area containing all anchor objects is C, and assuming that a size S of the anchor object 2904 is also known, then a number of the anchor object can be calculated as B=(A−C)/S. Thus, a bit for the Bth anchor object can be located in the bitmap memory area for bitmap 2706.

If, as above, the start address of a specific bitmap (result set identified by ID) is SA, then an address of the machine word in which the bit is located is M=SA+B div 64 on a 64 Bit hardware platform, and M=S+B div 32 on a 32 bit hardware platform (where div is the quotient of two integer values). Thus, within the machine word at address M, the Kth bit is set to 1 with K=B mod 64 on a 64 bit hardware platform and K=B mod 32 on a 32 bit hardware platform (where mod gives the remainder for the quotient of two integer values). Alternatively, K could also be calculated as K=B−(M−SA)*64 or K=B−(M−SA)*32.

Figure 30:
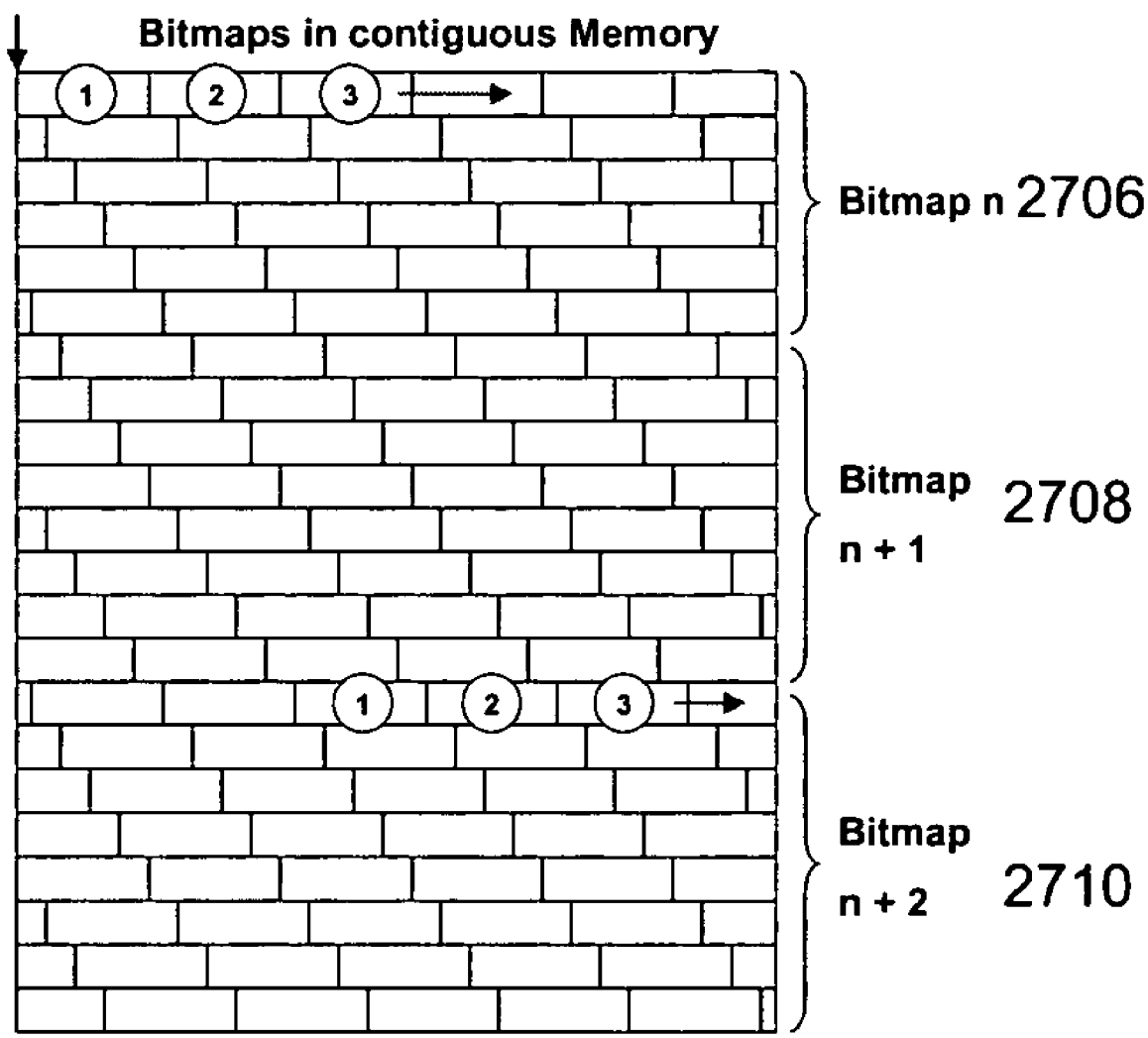
FIG. 30 is an illustration of a memory addressing scheme for storing bitmaps in accordance with the technique of FIG. 27.

FIG. 30 is an illustration of a memory addressing scheme for storing bitmaps in accordance with the technique of FIG. 27. FIG. 30 shows that for the combination of any two bitmaps with a logical combination such as AND/OR, the corresponding machine words have to be combined one after the other.

In FIG. 30, the bitmaps 2706 and 2710 are combined. Thus, machine word "1" of bitmap 2706 is combined with machine word 1 of bitmap 2710, with similar comments applying to machine words "2" and "3," as well as to all remaining machine words. Since, as already explained, all anchor elements are represented by one bit (set to "0" or "1," depending on a result of a query) in each of the bitmaps, all bitmaps have the same size and thus contain the same number of machine words.

Thus, a logical combination such as AND/OR of machine words is simply a bitwise AND/OR, which can usually be performed by a processing cycle on a CPU. Programming Languages such as C++ offer commands for bitwise operations.

The result of a combination of two result sets may be written to one of the two original bitmaps or to a new, third Bitmap. This is dependent on whether the original bitmaps may be overwritten, or whether they must be kept for later use.

After each combination of two machine words, a number of bits set to "1" in each machine word may be counted, as described above. The sum of the counting results for all machine words gives the number of bits set to 1 in the whole bitmap, which may be reported to an application as the number of hits.

For a logical NOT operation, only one bitmap is involved. Again, this operation can be executed as a bitwise NOT of all machine words contained in the bitmap, one after the other. The result may be written to the same bitmap (if it may be overwritten) or to a second, new bitmap if the original bitmap has to be kept for later use.

Finally, in the special case of a lean AND, only one result set (bitmap) is needed. For example, assuming that the chain of conditions described above for a lean AND operation (i.e., C1 AND C2 AND C3 AND C4 AND C5) are being combined. The bitmap is set up for the condition with the least number of hits, and then the bitmap is run through from the first to the last bit. For each bit set to "1," the fast query system 100 jumps to the corresponding record (using the relative addressing algorithm described above), and checks if all other conditions are true for this specific record. This check is the same procedure as for the use of guide lists, which is described above.

If all conditions are true, the bit keeps its value of "1," otherwise, the bit is set to 0. When a Bit is set to 0, a counter containing the number of bits set to 1 is reduced by 1, so that an associated counter for the lean AND operation maintains a current number of hits. Alternatively, instead of getting the number of hits from the initial, first bitmap and then reducing the counter each time a bit is set to "0" when a record does not match the other conditions, it is also possible to count only the number of hits in the resulting bitmap after the lean AND operation has been performed.

In conclusion, a number of techniques for performing logical operations have been described, and each of the techniques may be advantageously selected for use based on a context in which the technique will be used. The techniques generally involve the use of dynamic flags used as markers to build a result set in response to a search query.

The dynamic flags within a result set may be guide elements linked to one another, and to their respective data records, via pointers. In this case, the groups of guide elements forming result sets may each also be linked to one another via pointers, and may each be associated with a counter for counting a number of guide elements within a corresponding result set. Such a counter may be dynamically updated during and/or after performance of a logical operation, so that an accurate count of hits within a result set may be maintained.

The dynamic flags also may be individual bits within a bitmap, where the bitmap is linked to a particular result set ID via a pointer, and the individual bitmaps are linked to their corresponding data record(s) via a relative addressing scheme. In this case, a counter also may be used to determine a number of hits within a result set (bitmap), before, during, and after a particular logical operation.

In comparing the use of bitmaps to guide lists, it should be understood that bitmaps use much less memory to represent (particularly large) result sets. Moreover, bitwise operations are generally very fast, and allow for one-step logical combinations. Thus, for very large result sets in the range of millions of hits, bitmaps may be advantageously used over guide elements.

On the other hand, in cases where a result set contains a relatively small number of hits, then a bitmap may be virtually empty, and time spent checking each bit (or machine word) within the bitmap will largely be wasted. In the worst case, exactly one bit within each machine word is set to "1," so that every bit in every machine word must be individually checked.

Because guide lists are advantageous for relatively small result sets, while bitmaps are advantageous for relatively large result sets, there is inherently some type of break-even point between the two techniques, wherein using guide elements is equivalent to using bitmaps. By calculating this break-even point, the fast query system 100 may automatically decide which technique to use, and switch accordingly.

In this case, there need not be a parameter defining the break-even point; rather, the fast query system may find the break-even point by itself, using internal time measurements. Thus, on a given platform and for a given data volume and/or data value distribution, an optimum value for the break-even point may be used, as opposed to a poorly-selected break-even point selected by a human operator attempting to optimize the fast query system.

In this case, the fast query system 100 will not generally know a size of all result sets before performing logical operations thereon, particularly since some result sets, by definition, are formed by virtue of the logical combinations themselves. However, using the above-described simple relative addresses algorithm, it is possible to transform guide lists to bitmaps and vice versa, as needed.

A number of implementations have been described. Nevertheless, it will be understood that various modifications may be made. Accordingly, other implementations are within the scope of the following claims.

What is claimed is:

1. A method for performing a logical OR operation, comprising:
   building first and second result sets, further comprising:
      identifying data records including first and second attributes from amongst first and second attribute sets stored in first and second tree structures, respectively,
      assigning guide elements of the first result set to identified data records, and
      assigning guide elements of the second result set to identified data records,
      wherein the guide elements are each an instantiation of an object class in an object-oriented programming language, and linked to a data record via a pointer, and
      wherein the first result set includes fewer guide elements than the second result set;
   selecting the first result set;
   iteratively checking whether each of the guide elements of the first result set also exists in the second result set;
   renaming at least one of the guide elements of the first result set if the at least one of the guide elements of the first result set does not exist in the second result set;
   deleting the at least one of the guide elements of the first result set if the at least one of the guide elements of the first result set exists in the second result set;
   linking the renamed at least one of the guide elements of the first result set with the guide elements of the second result set, as the final result set; and
   outputting the final result set.

2. The method of claim 1, wherein each of the guide elements are associated with a data record by changing a value of a first bit within a first bitmap.

3. The method of claim 2 wherein bits within the bitmap correspond in number to a total amount of data records available for searching.

4. The method of claim 2 further comprising:
   linking a first result set identifier with the first bitmap via a first pointer; and
   linking a second result set identifier with a second bitmap via a second pointer,
   wherein the first result set identifier and the second result set identifier are linked together in a tree structure.

5. The method of claim 2 further comprising associating the first bit with the first record by calculating a bitmap memory address of the first bit relative to a data record memory address of the first record.

6. The method of claim 1,
   wherein the first result set further comprises a counter, and
   wherein the counter is decremented if the at least one of the guide elements of the first result set exists in the second result set.

7. A method for performing a logical AND operation, comprising:
   building a result set, further comprising:
      identifying data records including a first attribute from amongst a first attribute set stored in a first tree structure, and
      assigning guide elements of the result set to the identified data records,
      wherein the guide elements are each an instantiation of an object class in an object-oriented programming language, and linked to a data record via a pointer;
   iteratively selecting each of the guide elements;

checking the record associated with each of the guide
elements based upon a second attribute;
deleting at least one of the guide elements if the second
attribute is not met by the at least one of the guide
elements;
linking a predecessor of a deleted at least one of the guide
elements with a successor of the deleted at least one of
the guide elements; and
outputting the result set as the final result set.

8. The method of claim 7,
wherein the result set further comprises a counter; and
wherein the counter is decremented if the second attribute
is not met by the at least one of the guide elements.

9. A method for performing a logical AND operation,
comprising:
building first and second result sets, further comprising:
identifying data records including first and second
attributes from amongst first and second attribute
sets stored in first and second tree structures, respectively,
assigning guide elements of the first result set to
identified data records, and
assigning guide elements of the second result set to
identified data records,
wherein the guide elements are each an instantiation of
an object class in an object-oriented programming
language, and linked to a data record via a pointer,
and
wherein the first result set includes fewer guide elements than the second result set;
selecting the first result set;
iteratively checking whether each of the guide elements of
the first result set also exists in the second result set;
deleting the at least one of the guide elements of the first
result set if the at least one of the guide elements of the
first result set does not exist in the second result set;
linking a predecessor of a deleted at least one of the guide
elements with a successor of the deleted at least one of
the guide elements; and
outputting the first result set as the final result set.

10. The method of claim 9,
wherein the first result set further comprises a counter, and
wherein the counter is decremented if the at least one of
the guide elements of the first result set exists in the
second result set.

11. A method for performing a logical NOT operation,
comprising:
building a result set, further comprising:
identifying data records including a first attribute from
amongst a first attribute set stored in a first tree
structure, and
assigning guide elements of the result set to the identified data records,
wherein the guide elements are each an instantiation of
an object class in an object-oriented programming
language, and linked to a data record via a pointer;
iteratively checking each of the data records for a guide
element of the first result set associated with the each
of the data records;
instantiating a guide element in a second result set associated with each of the data records not associated with
a guide element of the first result set;
linking guide elements of the second result set;
deleting the first result set; and
outputting the second result set as the final result set.

12. The method of claim 11,
wherein the second result set further comprises a counter;
and
wherein the counter is incremented for each instantiated
guide element.

13. A computer program product, tangibly stored on a
computer-readable medium, for performing a logical OR
operation, the product comprising instructions operable to
cause a programmable processor to:
build first and second result sets, wherein building a result
set further comprises:
identifying data records including first and second
attributes from amongst first and second attribute
sets stored in first and second tree structures, respectively,
assigning guide elements of the first result set to
identified data records, and
assigning guide elements of the second result set to
identified data records,
wherein the guide elements are each an instantiation of
an object class in an object-oriented programming
language, and linked to a data record via a pointer,
and
wherein the first result set includes fewer guide elements than the second result set;
select the first result set;
iteratively check whether each of the guide elements of
the first result set also exists in the second result set;
rename at least one of the guide elements of the first result
set if the at least one of the guide elements of the first
result set does not exist in the second result set;
delete the at least one of the guide elements of the first
result set if the at least one of the guide elements of the
first result set exists in the second result set;
link the renamed at least one of the guide elements of the
first result set with the guide elements of the second
result set, as the final result set; and
output the final result set.

14. A computer program product, tangibly stored on a
computer-readable medium, for performing a logical AND
operation, the product comprising instructions operable to
cause a programmable processor to:
build a result set, wherein building a result set further
comprises:
identifying data records including a first attribute from
amongst a first attribute set stored in a first tree
structure, and
assigning guide elements of the result set to the identified data records,
wherein the guide elements are each an instantiation of
an object class in an object-oriented programming
language, and linked to a data record via a pointer;
iteratively select each of the guide elements;
check the record associated with each of the guide elements based upon a second attribute;
delete at least one of the guide elements if the second
attribute is not met by the at least one of the guide
elements;
link a predecessor of a deleted at least one of the guide
elements with a successor of the deleted at least one of
the guide elements; and
output the result set as the final result set.

15. A computer program product, tangibly stored on a
computer-readable medium, for performing a logical AND
operation, the product comprising instructions operable to
cause a programmable processor to:

build first and second result sets, wherein building a result set further comprises:
- identifying data records including first and second attributes from amongst first and second attribute sets stored in first and second tree structures, respectively,
- assigning guide elements of the first result set to identified data records, and
- assigning guide elements of the second result set to identified data records,
- wherein the guide elements are each an instantiation of an object class in an object-oriented programming language, and linked to a data record via a pointer, and
- wherein the first result set includes fewer guide elements than the second result set;

select the first result set;
iteratively check whether each of the guide elements of the first result set also exists in the second result set;
delete the at least one of the guide elements of the first result set if the at least one of the guide elements of the first result set does not exist in the second result set;
link a predecessor of a deleted at least one of the guide elements with a successor of the deleted at least one of the guide elements; and
output the first result set as the final result set.

16. A computer program product, tangibly stored on a computer-readable medium, for performing a logical NOT operation, the product comprising instructions operable to cause a programmable processor to:

build a result set, wherein building a result set further comprises:
- identifying data records including a first attribute from amongst a first attribute set stored in a first tree structure, and
- assigning guide elements of the result set to the identified data records,
- wherein the guide elements are each an instantiation of an object class in an object-oriented programming language, and linked to a data record via a pointer;

iteratively check each of the data records for a guide element of the first result set associated with the each of the data records;
instantiate a guide element in a second result set associated with each of the data records not associated with a guide element of the first result set;
link guide elements of the second result set;
delete the first result set; and
output the second result set as the final result set.

* * * * *